US009664026B2

(12) United States Patent
Greene et al.

(10) Patent No.: US 9,664,026 B2
(45) Date of Patent: May 30, 2017

(54) MODULAR SYSTEM FOR EXTRACTING HYDROCARBONS FROM SUBTERRANEAN VOLUMES AND ASSOCIATED METHODS

(71) Applicant: Nathaniel Greene, Marblehead, MA (US)

(72) Inventors: Nathaniel Greene, Marblehead, MA (US); Andrew Jones, Swampscott, MA (US); Michael Singleton, Calgary (CA); Katrina Westerhof, Boston, MA (US)

(73) Assignee: Nathaniel Davis Greene, Marblehead, MA (US)

( * ) Notice: Subject to any disclaimer, the term of this patent is extended or adjusted under 35 U.S.C. 154(b) by 268 days.

(21) Appl. No.: 14/204,197

(22) Filed: Mar. 11, 2014

(65) Prior Publication Data
US 2014/0262279 A1    Sep. 18, 2014

Related U.S. Application Data

(60) Provisional application No. 61/780,256, filed on Mar. 13, 2013.

(51) Int. Cl.
  *E21B 43/34* (2006.01)
  *E21B 43/40* (2006.01)
  (Continued)

(52) U.S. Cl.
  CPC .......... *E21B 43/34* (2013.01); *E21B 43/2406* (2013.01); *E21B 43/40* (2013.01);
  (Continued)

(58) Field of Classification Search
  CPC ...... E21B 43/34; E21B 43/2406; E21B 43/40; C02F 1/38; C02F 1/5245; C02F 5/06; C02F 2103/10
  See application file for complete search history.

(56) References Cited

U.S. PATENT DOCUMENTS

| 3,274,745 A | 9/1966 | McManus et al. |
| 3,563,477 A | 2/1971 | Schroeder et al. |
| (Continued) | | |

FOREIGN PATENT DOCUMENTS

| CA | 2654848 A1 | 8/2010 |
| DE | 3229900 A1 | 2/1984 |
| (Continued) | | |

OTHER PUBLICATIONS

International Search Report and Written Opinion mailed Apr. 16, 2015 in connection with Application No. PCT/US2014/023230.

*Primary Examiner* — Catherine Loikith
(74) *Attorney, Agent, or Firm* — Wolf, Greenfield & Sacks, P.C.

(57) ABSTRACT

Modular systems for extracting hydrocarbons from subterranean volumes and associated methods are generally described. Methods for extracting hydrocarbons from a subterranean volume are also described. Some of the described methods comprise flowing a mixture comprising hydrocarbons and water from the subterranean volume to a plurality of fluidically connected separation units and at least partially separating the hydrocarbons from the water using the separation units to produce a first stream comprising higher purity water than the mixture. In certain cases, the method includes fluidically disconnecting at least one of the separation units from the remaining separation units while the separating step is being performed. Some methods include fluidically connecting an additional separation unit to the separation unit while the separating step is being performed.

20 Claims, 16 Drawing Sheets

(51) Int. Cl.
*E21B 43/24* (2006.01)
*C02F 5/06* (2006.01)
*C02F 1/38* (2006.01)
*C02F 1/52* (2006.01)
*C02F 103/10* (2006.01)

(52) U.S. Cl.
CPC .............. *C02F 1/38* (2013.01); *C02F 1/5245* (2013.01); *C02F 5/06* (2013.01); *C02F 2103/10* (2013.01)

(56) References Cited

U.S. PATENT DOCUMENTS

| | | | |
|---|---|---|---|
| 5,474,411 | A | 12/1995 | Schoenfeld et al. |
| 7,288,192 | B2 | 10/2007 | Jowett |
| 7,964,092 | B2 * | 6/2011 | Iqbal ................. C10G 1/06 208/187 |
| 2007/0051513 | A1 | 3/2007 | Heins |
| 2008/0029447 | A1 | 2/2008 | Gaalswyk |
| 2008/0127662 | A1 | 6/2008 | Stanfield et al. |
| 2010/0218946 | A1 * | 9/2010 | Symington ........... E21B 43/247 166/272.6 |
| 2010/0282593 | A1 * | 11/2010 | Speirs ................. B01D 1/0058 203/11 |
| 2011/0146164 | A1 | 6/2011 | Haney et al. |
| 2012/0193093 | A1 | 8/2012 | James |
| 2012/0325469 | A1 | 12/2012 | Olson et al. |

FOREIGN PATENT DOCUMENTS

| | | |
|---|---|---|
| EP | 1004724 A2 | 5/2000 |
| WO | WO 03/031012 A1 | 4/2003 |

* cited by examiner

MODULAR SYSTEM FOR EXTRACTING HYDROCARBONS FROM SUBTERRANEAN VOLUMES AND ASSOCIATED METHODS

RELATED APPLICATIONS

This application claims priority under 35 U.S.C. §119(e) to U.S. Provisional Patent Application Ser. No. 61/780,256, filed Mar. 13, 2013, and entitled "Modular System for Extracting Hydrocarbons from Subterranean Volumes and Associated Methods," which is incorporated herein by reference in its entirety for all purposes.

TECHNICAL FIELD

Modular systems for extracting hydrocarbons from subterranean volumes and associated methods are generally described.

BACKGROUND

Many methods of extracting oil and other hydrocarbons from subterranean volumes are performed by drilling a well into the volume and driving the hydrocarbons out of the volume using natural or artificial driving mechanisms. In one such method, commonly referred to as steam assisted gravity drainage (SAGD), two wells are drilled in the formation from which hydrocarbons are to be extracted. In most such processes, one of the wells (i.e., the "upper well") is positioned higher than the other well (i.e., the "lower well"). Steam can be injected through the upper well, and a mixture of heated crude oil, bitumen (and/or other hydrocarbons), and condensed steam can be extracted via the lower well. The heat from the injected steam reduces the viscosity of the bitumen and heavier oils, which allows them to be transported more easily from the lower well.

SAGD processes and other hydrocarbon extraction processes, such as shale oil extraction, are generally performed at large scales, using specially designed plant equipment that is configured to be fixed in capacity and design once in place.

SUMMARY

Modular systems for extracting hydrocarbons from subterranean volumes and associated methods are generally described. Certain embodiments described herein allow for the expansion or contraction of the scale of the hydrocarbon extraction process during operation of the process. Some embodiments are related to equipment designs and configurations that can provide various operational advantages, including scalability, portability, and/or substantial reductions in downtime. The subject matter of the present invention involves, in some cases, interrelated products, alternative solutions to a particular problem, and/or a plurality of different uses of one or more systems and/or articles.

In one aspect, a method for extracting hydrocarbons from a subterranean volume is provided. The method comprises, according to certain embodiments, flowing a mixture comprising hydrocarbons and water from the subterranean volume to a plurality of fluidically connected separation units; at least partially separating the hydrocarbons from the water using the separation units to produce a first stream comprising higher purity water than the mixture; and fluidically disconnecting at least one of the separation units from the remaining separation units while the separating step is being performed.

In some embodiments, the method comprises flowing a mixture comprising hydrocarbons and water from the subterranean volume to a separation unit; at least partially separating the hydrocarbons from the water using the separation unit to produce a first stream comprising higher purity water than the mixture; and fluidically connecting an additional separation unit to the separation unit while the separating step is being performed.

In some embodiments, a method for extracting hydrocarbons is provided. The method comprises, according to some embodiments, injecting steam into a first subterranean volume via a first well drilled into the first subterranean volume using a first steam generation unit to reduce the viscosity of at least a portion of the hydrocarbons within the first subterranean volume; and within one year of beginning the injection of steam into the first subterranean volume, injecting steam into an additional subterranean volume via an additional well drilled into the additional subterranean volume using an additional steam generation unit fluidically connected to the first steam generation unit to reduce the viscosity of at least a portion of the hydrocarbons within the additional subterranean volume. In some embodiments, the beginning of the injection of steam into the additional subterranean volume via the additional steam generation unit is after the beginning of the injection of steam into the first subterranean volume via the first steam generation unit.

In one aspect, a system for extracting hydrocarbons from a subterranean volume is provided. The system comprises, according to some embodiments, a well output conduit configured to transport a mixture comprising hydrocarbons and water from the subterranean volume, the well output conduit comprising a plurality of outputs; and a plurality of separation units configured to be fluidically connected to the well output conduit and to at least partially separate the hydrocarbons from the water to produce a first stream comprising higher purity water than the mixture. In some embodiments, the system is configured such that the separation units can be connected or disconnected from the well output conduit while the remaining separation units at least partially separate the hydrocarbons and the water.

The system comprises, in some embodiments, a plurality of separation units configured to receive a mixture comprising water and hydrocarbons from the subterranean volume and to at least partially separate the hydrocarbons from the water, the plurality of separation units fluidically connected to each other in parallel; and a plurality of water purification units, each of the plurality of water purification units fluidically connected to at least one of the separation units.

In certain embodiments, a water purification unit is provided. In some embodiments, the water purification unit can be part of a multi-unit, modular system configured for extracting hydrocarbons from a subterranean volume, wherein the water purification unit is configured to remove at least a portion of ions contained within a feed stream supplied to the water purification unit to produce a product stream having a higher water purity than the feed stream. In certain embodiments, the water purification unit comprises a lime softener configured to form precipitant salts comprising the ions within the feed stream, and a precipitant separator, separate from the lime softener, configured to at least partially separate the precipitant formed by the lime softener from water within the feed stream to produce the product stream.

According to some embodiments, a modular system for extracting hydrocarbons from a subterranean volume is provided. The system comprises, in certain embodiments, a first module comprising a first separation unit configured to receive a first portion of a mixture comprising the hydrocarbons from a subterranean well via a first mixture stream and to produce a first separated stream comprising higher purity water than the first mixture stream, wherein the first mixture stream is fluidically connected to a first module input, the first separated stream is fluidically connected to a first module output, and the first module comprises a module interface in which the first module input and the first module output are located such that the first module input and the first module output face in substantially the same direction. In some embodiments, the system comprises a second module comprising a second separation unit configured to receive a second portion of a mixture comprising the hydrocarbons and water from the subterranean well via a second mixture stream and to produce a second separated stream comprising higher purity water than the second mixture stream, wherein the second mixture stream is fluidically connected to a second module input, the second separated stream is fluidically connected to a second module output, and the second module comprises a module interface in which the second module input and the second module output are located such that the second module input and the second module output face in substantially the same direction.

In certain embodiments, a modular, multi-unit system for extracting hydrocarbons from a subterranean volume is provided. In some embodiments, the system comprises a hydrocyclone configured to receive a mixture comprising hydrocarbons, water, and contaminants from the subterranean volume and to at least partially separate the hydrocarbons from the water to produce a first stream comprising higher purity water than the mixture; a water purification unit fluidically connected to the hydrocyclone and configured to remove at least a portion of the ions contained within the first stream; and a steam generation unit fluidically connected to the water purification unit and configured to produce steam from the water within the first stream and transport the steam into the subterranean volume.

In certain embodiments, the system comprises a plurality of modularized separation units configured to receive a mixture comprising hydrocarbons and water from the subterranean volume and to at least partially separate the hydrocarbons from the water to produce a first stream comprising higher purity water than the mixture; a plurality of modularized water purification units configured for fluidic interconnection with the separation units and configured to remove at least a portion of ions contained within the first stream to produce a second stream comprising higher purity water than the first stream; and a plurality of modularized steam generation units configured for fluidic interconnection with the water purification units and configured to produce steam from at least a portion of the second stream and transport at least a portion of the steam into the subterranean volume. In some embodiments, the multi-unit system has a capacity of at least 100 bbl/day and each individual modularized separation unit, modularized water purification unit, and modularized steam generation unit has a mass not exceeding 65,000 lbs.

In certain embodiments, the system comprises a plurality of separation units configured to receive a mixture comprising hydrocarbons and water from the subterranean volume and to at least partially separate the hydrocarbons from the water to produce a first stream comprising higher purity water than the mixture; a plurality of water purification units configured for fluidic interconnection with the separation units and configured to remove at least a portion of ions contained within the first stream to produce a second stream comprising higher purity water than the first stream; and a plurality of steam generation units configured for fluidic interconnection with the water purification units and configured to produce steam from at least a portion of the second stream and transport at least a portion of the steam into the subterranean volume. In some embodiments, the multi-unit system has a capacity of at least 100 bbl/day and none of the maximum heights of the separation units, the water purification units, and the steam generation units exceed 20 feet during operation of the system.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
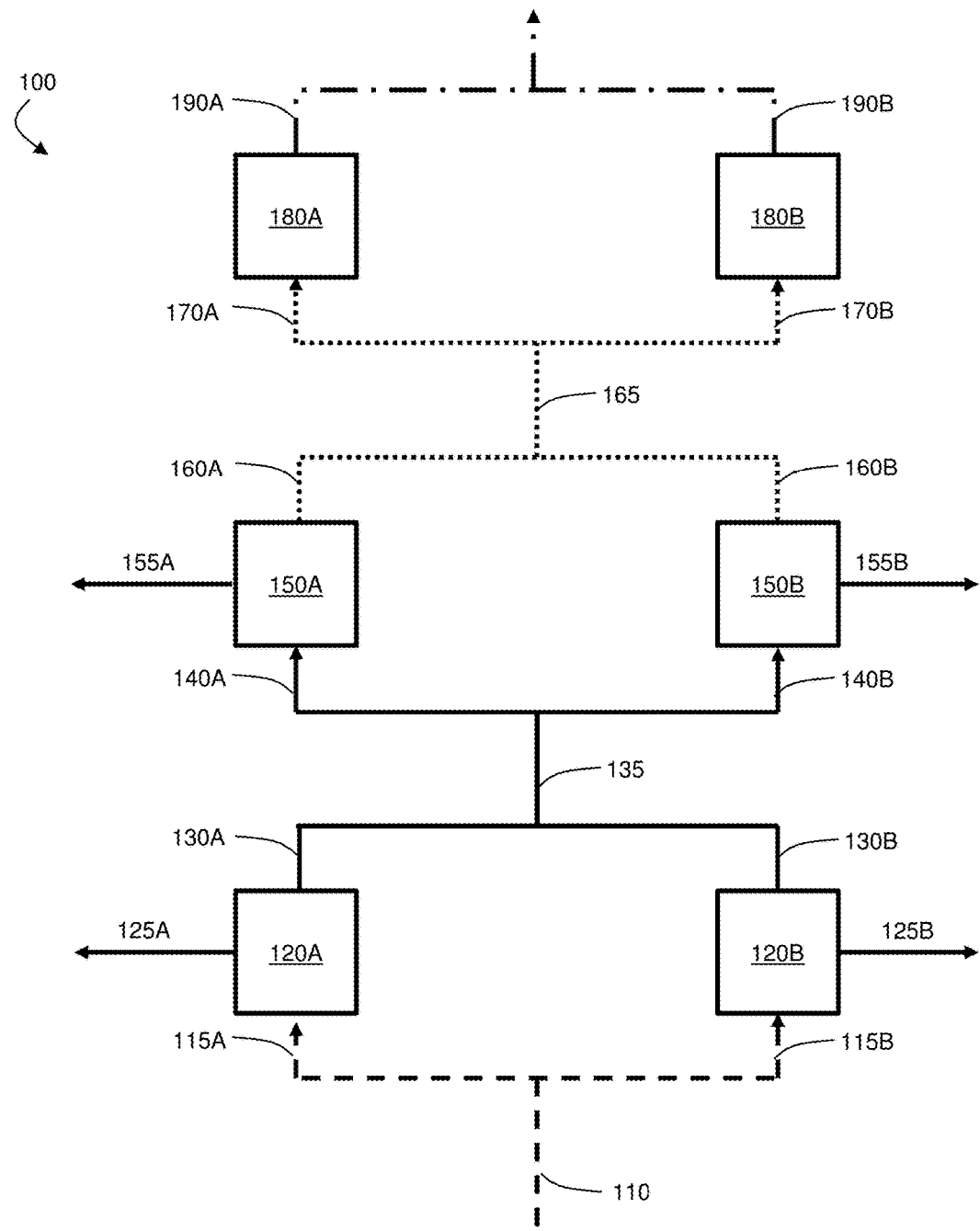
FIG. 1 is a schematic illustration of a system for extracting hydrocarbons from a subterranean volume, according to certain embodiments.

Inventive systems, components, and methods for extracting hydrocarbons from subterranean volumes are generally described.

Certain embodiments relate to methods, systems, and configurations of components thereof that allow for the expansion or contraction of the processing capacity of the hydrocarbon extraction process during operation. The output and/or capacity of the process can be modified, for example, by employing a plurality of units performing the same or similar operation connected in parallel (as opposed to a single large scale unit operation or a plurality of series connected units). In some embodiments, the capacity of the hydrocarbon extraction process can be expanded or contracted, during operation, by adding or removing one or more components to/from the parallel-connected units. In addition to providing flexible scalability, such configurations also can allow, according to certain embodiments, for a reduction in the amount of system downtime (e.g., to repair faulty components, to perform regularly-scheduled maintenance, etc.) by removing, repairing, and/or replacing only the components in need of repair, replacement, or maintenance, while avoiding total system shutdown or while shutting the system down only for a limited amount of time.

Certain embodiments employ portable modules, units, and other components. The use of portable components can allow for easy transport and/or relatively fast assembly without the need for heavy duty and/or complicated transportation and assembly equipment. In certain embodiments, the components described herein can be containerized (for example, storable and moveable within a shipping container, which may be of essentially standard size), which can allow the components to be shipped via highways and railways.

System and component configurations that allow for relatively easy modification of component interconnectivity are also described.

Certain embodiments involve the use of various "units," which can be organized within modules. Generally, the term "module" is used herein to refer to a structure within which one or more units is positioned that allows for the transportation of the unit(s) via movement of the module. In contrast, the term "unit" is generally used herein to refer to one or more devices/unit operations that (collectively, in the case of multiple devices/unit operations) is/are designed to perform a particular function (e.g., a separation unit (separate hydrocarbons from water), a water purification unit, and/or a steam generation unit). A "modularized unit" is a unit that is positioned within a module. For example, if a module contains a plurality of steam generators, the plurality of steam generators would constitute a modularized unit of steam generators. In any instance in which a "unit" is described herein, it should be understood that, in certain embodiments, that unit can be (although need not necessarily be) positioned within a module, alone, or in combination with another unit. In certain embodiments, only a portion of a unit may be contained within a particular module, while the remaining portion(s) may be positioned in one or more other modules interconnected with the first module, such that the "unit" is partitioned across multiple, interconnected modules.

FIG. 1 is a schematic diagram of an exemplary system 100 for extracting hydrocarbons from a subterranean volume. System 100 includes well output conduit 110 configured to transport a mixture comprising hydrocarbons and water from the subterranean volume to the units of the system for processing. The water from the subterranean volume may include, for example, water that was transported to the subterranean volume (e.g., in the form of steam, pressurized water, or in any other form) to aid in the removal of hydrocarbons and/or, in some cases, water that was originally present within the subterranean volume. The subterranean volume can correspond to any volume below ground level that contains hydrocarbons. The subterranean volume need not necessarily correspond to a continuous void in which hydrocarbons are located. For example, the subterranean volume can correspond to a volume that is at least partially occupied by soil, rock, or other materials in addition to, or that contain (e.g. oil containing shale), the hydrocarbons.

Well output conduit 110 (which can be fluidically connected to, for example, a well head) can comprise a plurality of outputs 115 (e.g., outputs 115A and 115B in FIG. 1). Outputs 115 can be connected to a plurality of separation units (e.g. 120A and 120B). Certain embodiments involve flowing a mixture comprising hydrocarbons and water from the subterranean volume to the plurality of fluidically connected separation units, and at least partially separating the hydrocarbons from the water using the separation units to produce first streams 130A and 130B comprising higher purity water than the mixture within well output conduit 110.

Separation units 120A and 120B can have a variety of configurations, and can include a variety of components, as described in more detail below. Generally, the separation units are configured to receive a mixture comprising hydrocarbons and water (e.g., via streams 115A and 115B in FIG. 1) and to produce streams (e.g., streams 130A and 130B in FIG. 1) comprising higher purity water than the mixture. In certain instances, the separation units can also include an additional output stream(s) (e.g., streams 125A and 125B in FIG. 1, and/or other output streams), for example, to transport the hydrocarbons that are separated from the water out of the system (e.g., for subsequent use, further processing/refining, commercial sale, or the like).

In certain embodiments, the separation units can be fluidically connected to each other in parallel. For example, in FIG. 1, separation units 120A and 120B are fluidically connected to each other in parallel. Those of ordinary skill in the art are familiar with parallel (as opposed to series) fluidic connections between components. When components are connected in parallel, material from an upstream location can be divided into sub-streams and subsequently transported through the parallel-connected components simultaneously. For example, in FIG. 1, the mixture within output conduit 110 is divided into sub-streams 115A and 115B and subsequently transported to separation units 120A and 120B. In a series fluidic connection, on the other hand, material from an upstream location is transported through the fluidically-connected components one after another. For example, if separation units 120A and 120B were connected in series (rather than in parallel), the mixture within well output conduit 110 would be transported entirely through separation unit 120A first and subsequently entirely through separation unit 120B.

In certain embodiments, the system can be configured such that at least one of the separation units can be disconnected from the well output conduit and/or from the remaining separation units and/or from other units within the system while the remaining separation units remain functional to at least partially separate the hydrocarbons and the water. For example, in FIG. 1, separation unit 120A can be configured such that it can be individually disconnected from separation unit 120B (and conduit 110) while separation unit 120B continues to at least partially separate hydrocarbons and water. In some embodiments, flow to separation unit 120A can be stopped and at least partially redirected to separation unit 120B and/or other separation units within the system.

The system can be configured, in some embodiments, such that an additional separation unit is fluidically connected to the system while separation of the hydrocarbons and water is taking place. For example, referring back to FIG. 1, a mixture comprising water and hydrocarbons can be transported to separation unit 120A, in certain embodiments, such that separation unit 120A at least partially separates the water and the hydrocarbons. In some such embodiments, additional separation unit 120B can be added to the system by fluidically connecting it (e.g., via stream 115B) to conduit 110. After separation unit 120B has been connected, flow can be redirected (e.g., while separation unit 120A continues to perform water and hydrocarbon separation) such that separation unit 120B receives at least a portion of the flow that was originally directed to separation unit 120A.

The ability to connect and/or disconnect one (or more) of the separation units from the system during operation can provide a variety of advantages. For example, if hydrocarbon production from the subterranean volume increases or decreases, one or more separation units can be added or removed, respectively, from the system. In this way, the capacity of the system can be adjusted to account for changes in output. The ability to remove and/or add separation units also allows for easy repair, testing, and/or maintenance of such systems, as described in more detail below.

While system 100 in FIG. 1 includes two separation units (120A and 120B) fluidically connected in parallel, it should be understood that, in other cases, additional separation units could be included (e.g., at least 3, at least 5, at least 10, or more, in certain embodiments), in parallel, and additional separation units could also be connected in series with any or all of the parallel connected separation units, if desired.

System 100 comprises, in some embodiments, one or more water purification units, which can be fluidically connected (e.g. in series as illustrated) to at least one of the separation units and/or to each other. The water purification unit(s) can have a variety of configurations, and can include a variety of components, as described in more detail below. Generally, the water purification units are configured to receive streams having relatively high water purities (compared to the original hydrocarbon/water mixture) and remove at least a portion of the ions (e.g., cations) contained within those streams. Removing the ions from these water streams, including cations that are only soluble in water to a limited degree (e.g., $Mg^{2+}$, $Ca^{2+}$, $Sr^{2+}$ and the like), can prevent downstream fouling of process equipment.

In FIG. 1, for example, water purification units 150A and 150B are fluidically connected to each other and to separation units 120A and 120B. In some embodiments, at least a portion of the first stream produced by the separation units (having higher purity water than the mixture within the stream from the subterranean space) can be transported to the water purification units. For example, in FIG. 1, streams 130A and 130B are optionally combined and subsequently split before entering water purification units 150A and 150B. Certain embodiments involve using the water purification units to remove at least a portion of ions (e.g., cations) within the first streams (from the separation units) to produce one or more second streams comprising higher purity water than the first streams. In FIG. 1, for example, water purification units 150A and 150B can be used to remove at least a portion of the ions contained within streams 130A and/or 130B to produce streams 160A and 160B, which have a higher water purity than streams 130A and 130B.

In FIG. 1, water purification units 150A and 150B are configured to receive first streams 130A and 130B comprising water and ions and to produce second streams 160A and 160B comprising higher purity water than the first streams. In certain instances, the water purification units can also include additional output stream(s) (e.g., streams 155A and 155B in FIG. 1, and/or other output streams), for example, to transport the ions (e.g., in precipitated salt form, e.g. in a slurry) that are separated from the water out of the system.

In certain embodiments, at least a portion of the water purification units can be fluidically connected to each other in parallel. For example, in FIG. 1, water purification units 150A and 150B are fluidically connected to each other in parallel.

The system can be configured, in some embodiments, such that at least one of the water purification units (when present) can be fluidically disconnected from the remaining water purification units and/or from the separation units and/or from the well output conduit while the remaining water purification units at least partially remove ions from water (and/or while the separation units at least partially separate hydrocarbons from water). For example, in FIG. 1, water purification unit 150A can be configured such that it can be individually disconnected from water purification unit 150B (and separation units 120A-120B and conduit 110) while water purification unit 150B continues to function to at least partially remove ions from an incoming water stream. In some embodiments, flow to water purification unit 150A can be stopped and at least partially redirected to water purification unit 150B and/or other water purification units within the system.

In some embodiments, the system is configured such that an additional water purification unit can be fluidically connected to the system while removal of ions (and/or separation of hydrocarbons and water) is being performed. For example, referring back to FIG. 1, an ion-containing water stream can be transported to water purification unit 150A, in certain embodiments, such that water purification unit 150A at least partially removes the ions from the water. In some such embodiments, additional water purification unit 150B can be added to the system by fluidically connecting it (e.g., via stream 140B) to the separation units. After water purification unit 150B has been connected, flow can be redirected (e.g., while water purification unit 150A continues to perform water purification) such that water purification unit 150B receives at least a portion of the flow that was originally directed to water purification unit 150A.

The ability to connect and/or disconnect one (or more) of the water purification units from the system during operation can allow for the capacity of the system to be adjusted to account for changes in output and/or allow for relatively easy repair, testing, and/or maintenance of such systems.

While system 100 in FIG. 1 includes two water purification units (150A and 150B) fluidically connected in parallel, it should be understood that, in other cases, additional water purification units could be included (e.g., at least 3, at least 5, at least 10, or more, in certain embodiments) in parallel, and additional water purification units could also be connected in series with any or all of the parallel connected water purification units, if desired.

In certain embodiments, system 100 comprises one or more steam generation units, which can be fluidically connected (e.g. in series as illustrated) to at least one of the water purification units, at least one of the separation units, and/or to each other. The steam generation unit(s) can have a variety of configurations, and can include a variety of components, as described in more detail below. Generally, the steam generation units are configured to produce steam from at least a portion of the streams having relatively high water purities (compared to the original hydrocarbon/water mixture and compared to the streams from the separation units) produced by the water purification units. In certain embodiments, the steam produced from the steam generation units can be transported back into the subterranean volume (e.g., when used as part of a SAGD process, a cyclic steam stimulation (CSS) process, or the like). The steam produced from the steam generation units can be used, for example, to reduce the viscosity of the hydrocarbons or otherwise aid in the extraction of the hydrocarbons from the subterranean volume.

In FIG. 1, steam generation units 180A and 180B are fluidically connected to each other, to water purification units 150A and 150B, and to separation units 120A and 120B. In some embodiments, at least a portion of the second stream(s) produced by the water purification units (having higher purity water than the first streams produced by the separation units and the mixture within the stream from the subterranean space) can be transported to the steam generation units. For example, in FIG. 1, streams 160A and 160B are optionally combined and subsequently split before entering steam generation units 180A and 180B. Steam generation units 180A and 180B can be used to produce steam, at least a portion of which can be transported back to the subterranean volume (e.g., via streams 190A and 190B).

In certain embodiments, at least a portion of the steam generation units can be fluidically connected to each other in parallel. For example, in FIG. 1, steam generation units 180A and 180B are fluidically connected to each other in parallel.

The system can be configured, in some embodiments, such that at least one of the steam generation units (when present) can be fluidically disconnected from the remaining steam generation units (and/or from the water purification units and/or from the separation units and/or from the well output conduit) while the separation, removal, and/or steam production steps are being performed. For example, in FIG. 1, steam generation unit 180A can be configured such that it can be individually disconnected from steam generation unit 180B (and water purification units 150A and 150B, separation units 120A-120B, and conduit 110) while steam generation unit 180B continues to produce steam (and/or while water purification units 150A and 150B at least partially remove ions from an incoming water stream and/or while separation units 120A and 120B at least partially separate hydrocarbons from water). In some embodiments, flow to steam generation unit 180A can be stopped and at least partially redirected to steam generation unit 180B and/or other steam generation units within the system.

In some embodiments, the system is configured such that an additional steam generation unit can be fluidically connected to the system (e.g., to the steam generation units, the separation units, and/or the water purification units) while the separation, removal, and/or steam generation steps are being performed. For example, referring back to FIG. 1, a water-containing stream can be transported to steam generation unit 180A, in certain embodiments, such that steam generation unit 180A produces steam. In some such embodiments, additional steam generation unit 180B can be added to the system by fluidically connecting it (e.g., via stream 170B) to the water purification units, for example, while steam generation unit 180A continues to produce steam (and/or while water purification units 150A and 150B at least partially remove ions from an incoming water stream and/or while separation units 120A and 120B at least partially separate hydrocarbons from water). After steam generation unit 180B has been connected, flow can be redirected (e.g., while steam generation unit 180A continues to perform steam generation) such that steam generation unit 180B receives at least a portion of the flow that was originally directed to steam generation unit 180A.

The ability to connect and/or disconnect one (or more) of the steam generation units from the system during operation can allow for the capacity of the system to be adjusted to account for changes in hydrocarbon output and/or allow for relatively easy repair, testing, and/or maintenance of such systems.

While system 100 in FIG. 1 includes two steam generation units (180A and 180B) fluidically connected in parallel, it should be understood that, in other cases, additional steam generation units could be included (e.g., at least 3, at least 5, at least 10, or more, in certain embodiments) in parallel, and additional steam generation units could also be connected in series with any or all of the parallel connected steam generation units, if desired.

In the system illustrated in FIG. 1, streams 130A and 130B from the separation units are merged to form combined stream 135 before being split into streams 140A and 140B and transported to the water purification units. In addition, in FIG. 1, streams 160A and 160B from the water purification units are merged to form combined stream 165 and subsequently split into streams 170A and 170B prior to transport to the steam generation units. Arranging the system as illustrated in FIG. 1—in which no separation unit is paired with an individual water purification unit and no water purification unit is paired with an individual steam generation unit—can allow one to add and/or remove a single separation unit, a single water purification unit, and/or a single steam generation unit without disconnecting another unit in the system. Such systems can be implemented, for example, by housing each separation unit, each water purification unit, and each steam generation unit within its own module (as discussed in more detail below) and connecting components performing a common function in parallel (e.g., using a centralized manifold scheme, as described in more detail below, or using any other suitable parallel fluidic connection scheme).

Figure 2A:
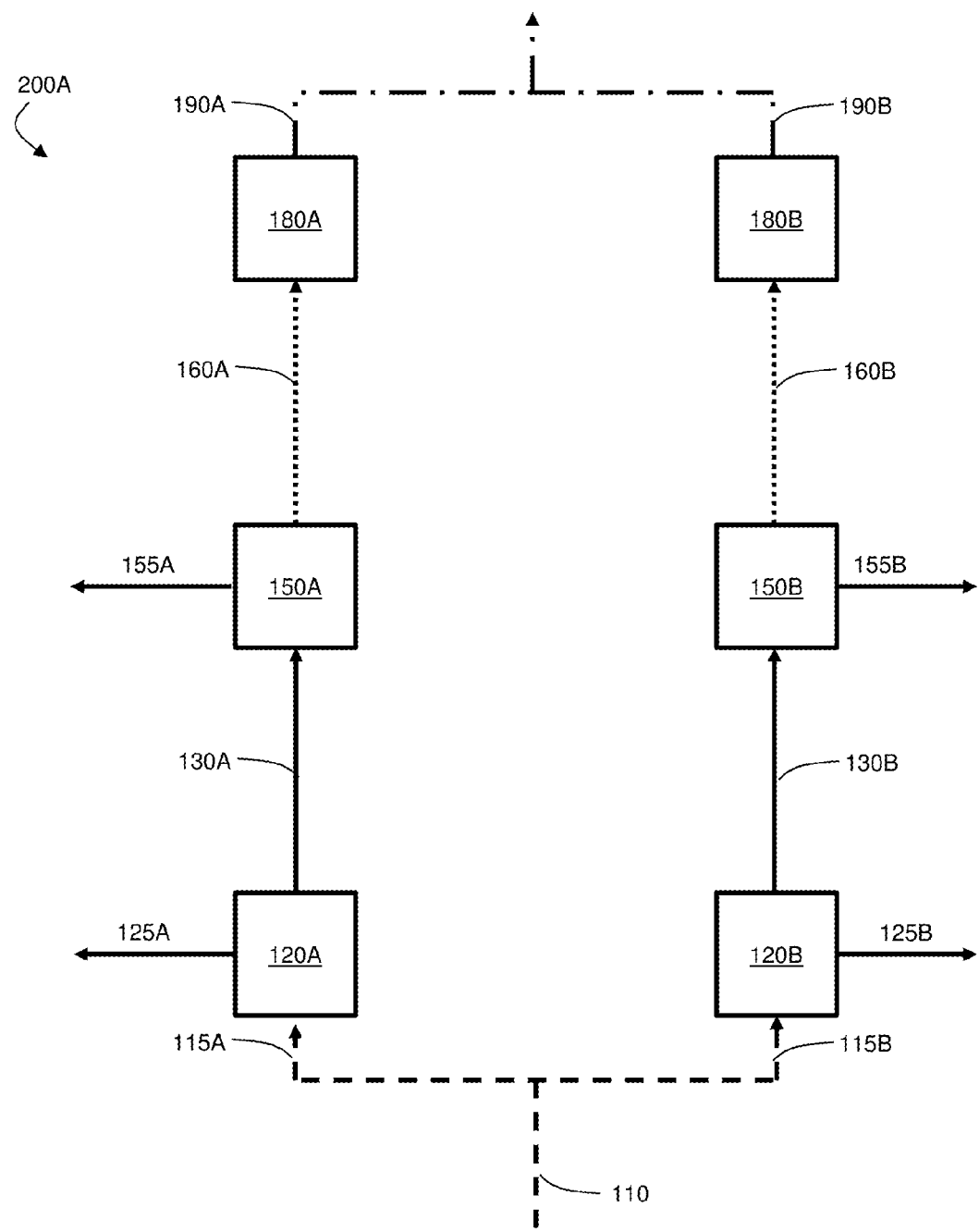
FIGS. 2A-2C are schematic illustrations, according to some embodiments, of systems for extracting hydrocarbons from a subterranean volume.

However, the invention is not limited to the arrangement illustrated in FIG. 1. For example, FIG. 2A is a schematic illustration of a system 200A in which each separation unit is coupled to a water purification unit and a steam generation unit. For example, in FIG. 2A, separation unit 120A, water purification unit 150A, and steam generation unit 180A are coupled to each other. Such coupling can be achieved, for example, by housing units 120A, 150A, and 180A each within a single module or together within a single module, and fluidically connecting the units and/or modules in series. Similarly, in FIG. 2A, separation unit 120B, water purification unit 150B, and steam generation unit 180B are coupled to each other. It should be noted that, while separation units 120A and 120B are coupled to other downstream units in FIG. 2A, they are also fluidically connected to each other in parallel. While separation unit 120A can be removed from system 200A in FIG. 2A without removing separation unit 120B, separation unit 120A cannot be removed from system 200A, while maintaining operation, without also stopping fluid flow through water purification unit 150A and steam generation unit 180A.

Figure 2B:
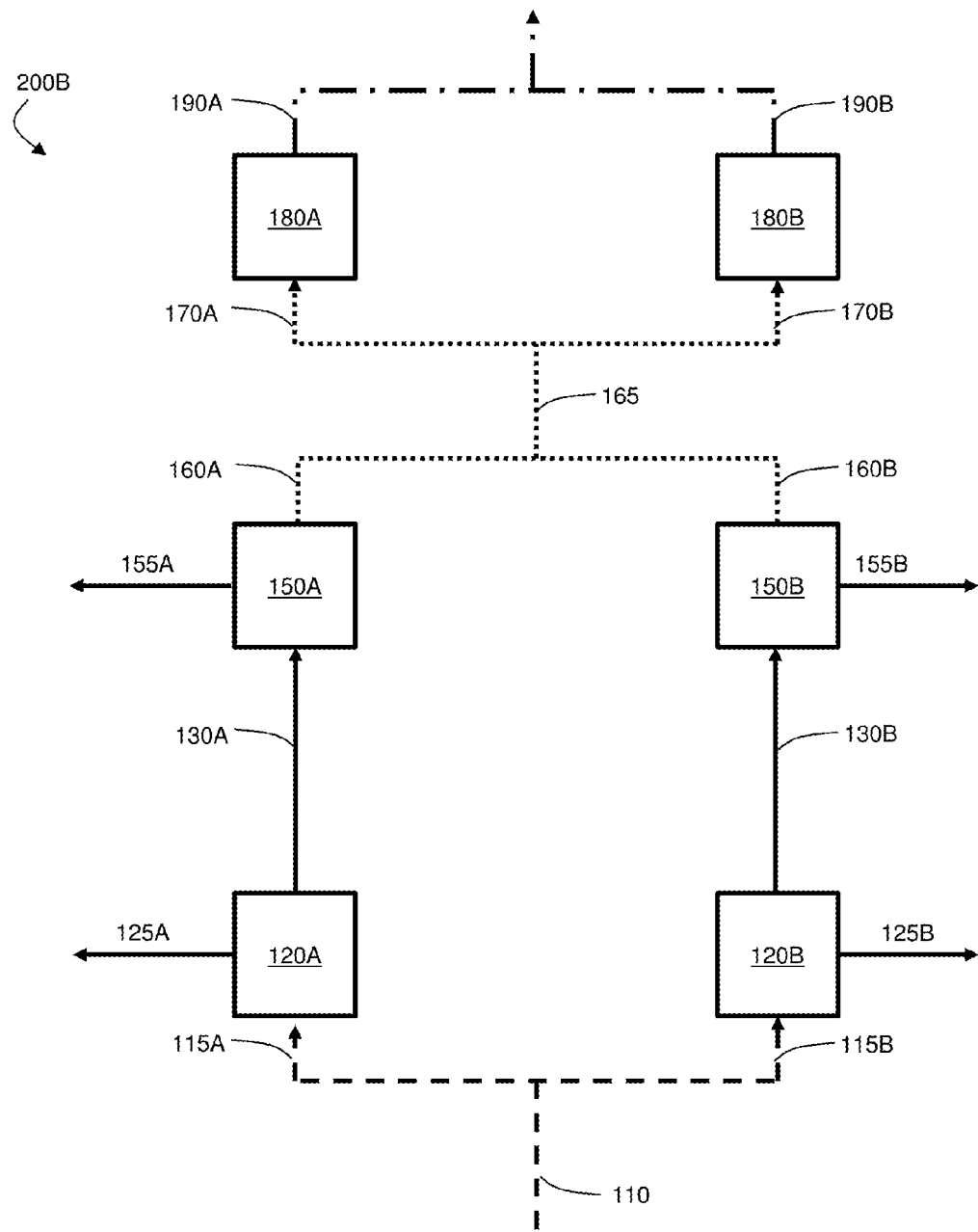
Figure 2C:
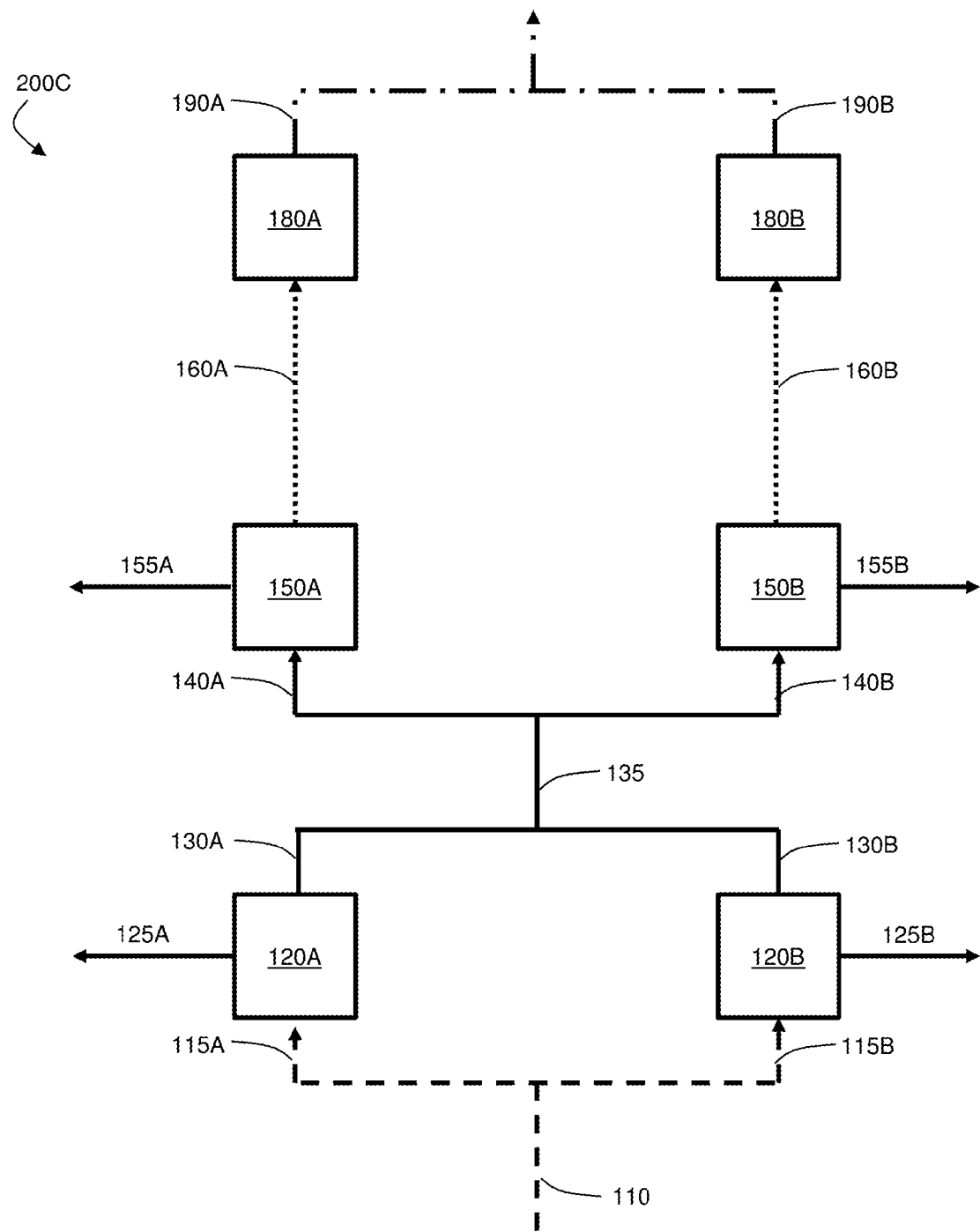

Other connectivity arrangements are also possible. FIG. 2B is a schematic illustration of a system, 200B, in which the water purification units are coupled to the separation units (e.g., by housing them in a single module and fluidically connecting them in series). FIG. 2C is a schematic illustration of a system, 200C, in which the steam generation units are coupled to the water purification units.

The ability to increase the scale of a hydrocarbon extraction process by adding modular components can increase startup speed, in certain embodiments. For example, in certain embodiments, rather than drilling multiple wells prior to beginning hydrocarbon extraction as is conventional, the extraction process can be started after drilling a relatively small number of wells (e.g., after drilling fewer than 10 wells or well pairs, after drilling fewer than 5 wells or well pairs, or after drilling as few as a single well or well pair, in some instances). This ease of scalability can be particularly useful, for example, in hydrocarbon extraction processes in which steam injection is used. In certain embodiments, steam can be injected into a first subterranean volume via a first well drilled into the first subterranean volume using a first steam generation unit to reduce the viscosity of at least a portion of the hydrocarbons within the first subterranean volume. In certain embodiments, within a relatively short period of time (e.g., within one year, within 100 days, or within 10 days) of beginning the injection of steam into the first subterranean volume, steam can be injected into an additional subterranean volume via an additional well drilled into the additional subterranean volume using an additional steam generation unit. In some such embodiments, the beginning of the injection of steam into the additional subterranean volume via the additional steam generation unit is after the beginning of the injection of steam into the first subterranean volume via the first steam generation unit. In certain such embodiments, the first steam generation unit can continue to operate during the drilling of the additional well, during the startup of steam flow from the second steam generation unit, and/or during (and/or after) the establishment of a fluidic connection between the first steam generation unit and the additional steam generation unit.

Figure 3A:
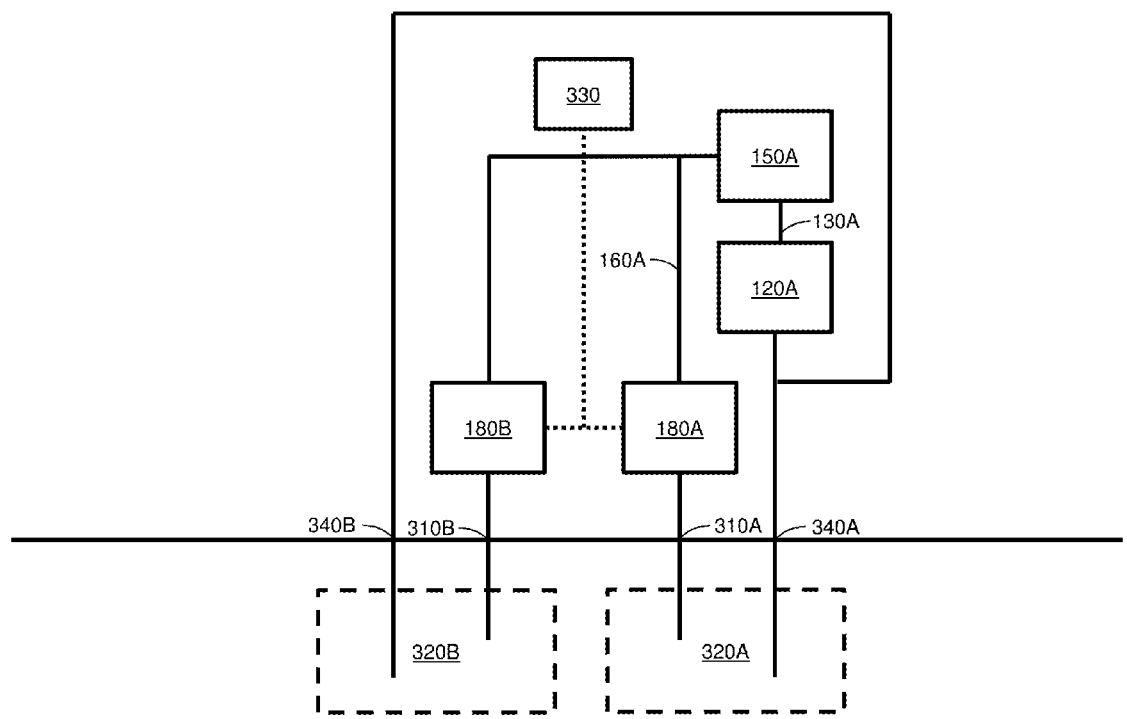
FIGS. 3A-3B are, according to certain embodiments, schematic illustrations of systems including multiple steam generation units for extracting hydrocarbons from a subterranean volume.

FIG. 3A is an exemplary schematic illustration outlining the method by which multiple well pairs can be quickly integrated into a hydrocarbon extraction process. In FIG. 3A, first well 310A has been drilled into first subterranean volume 320A. A first steam generation unit 180A can be used to inject steam into first subterranean volume 320A via first well 310A. The steam injected by steam generation unit 180A can reduce the viscosity of at least a portion of the hydrocarbons within first subterranean volume 320A. In certain embodiments, an additional well 310B can be drilled into additional subterranean volume 320B. In some such embodiments, within one year (or within 100 days, or within 10 days) of beginning the injection of steam into first subterranean volume 320A, steam can be injected into additional subterranean volume 320B via additional well 310B using additional steam generation unit 180B.

In some such embodiments, the beginning of the injection of steam into the additional subterranean volume via the additional steam generation occurs after the beginning of the injection of steam into the first subterranean volume via the first steam generation unit. For example, referring back to FIG. 3A, in certain embodiments, steam can first be injected into subterranean volume 320A, and subsequently, steam injection into additional subterranean volume 320B can be initiated. In some such embodiments, the beginning of the injection of steam into the additional subterranean volume via the additional steam generation unit is at least about 1 day after the beginning of the injection of steam into the first subterranean volume via the first steam generation unit. For example, in certain embodiments, steam injection into subterranean volume 320A in FIG. 3A may be initiated at a first time, and steam injection into subterranean volume 320B may be initiated at a second time that is at least about 1 day after the initiation of steam injection into subterranean volume 320A.

In some embodiments, a fluidic connection between the first steam generation unit and the additional steam generation unit can be established. For example, referring to FIG. 3A, steam generation units 180A and 180B can be fluidically connected to each other, in certain embodiments. A fluidic connection between the first steam generation unit and the additional steam generation unit can be established at any suitable time, including before, during, and/or after steam injection has been initiated into the first and/or second subterranean volumes. For example, in some embodiments, the fluidic connection between steam generation units 180A and 180B can be established before, during, and/or after steam generation unit 180A has begun injecting steam into subterranean volume 320A. In certain embodiments, the fluidic connection between steam generation units 180A and 180B can be established before, during, and/or after steam generation unit 180B has begun injecting steam into subterranean volume 320B. In some such embodiments, the fluidic connection between steam generation units 180A and 180B can be established while steam generation unit 180A continues to operate. As one example, in FIG. 3A, steam generation units 180A and 180B are fluidically connected to each other via a common input stream from water source 330 (e.g., a water treatment tank that holds or treats fresh water and/or recycled water for use in the steam generation units (e.g., as makeup water or as the water originally used to start the process)). In some embodiments, steam generation units 180A and 180B can both be fluidically connected to a common water purification unit (and/or a set of common water purification units), which can be used to supply water to both steam generation units 180A and 180B after steam generation unit 180B has been integrated.

After steam has been injected into subterranean volumes 320A and 320B by steam generation units 180A and 180B, according to certain embodiments, mixtures of water and hydrocarbons can be extracted from subterranean volumes 320A and 320B via wells 340A and 340B. In some embodiments, a mixture including water comprising at least a portion of the water injected as steam from first steam generation unit 180A and hydrocarbons from first subterranean volume 320A can be transported to first separation unit 120A (e.g., via well 340A). First separation unit 120A can be used to at least partially separate the hydrocarbons from the water to produce a first stream having a higher water purity than the mixture exiting well 340A. In addition, in some embodiments, at least a portion of stream 130A can be transported to water purification unit 150A to remove at least a portion of ions within first stream 130A and to produce a second stream 160A having a higher water purity than first stream 130A.

Similarly, in some embodiments, a mixture including water comprising at least a portion of the water injected as steam from second steam generation unit 180B and hydrocarbons from second subterranean volume 320B can be transported to a separation unit where the water and hydrocarbons can be at least partially separated. In certain embodiments, at least a portion of the mixture from subterranean volume 320B can be transported to first separation unit 120A, and, in certain embodiments, subsequently to water purification unit 150A, as illustrated in FIG. 3A. In some such embodiments, purified water from water purification unit 150A can be supplied to both steam generation unit 180A and steam generation unit 180B.

Figure 3B:
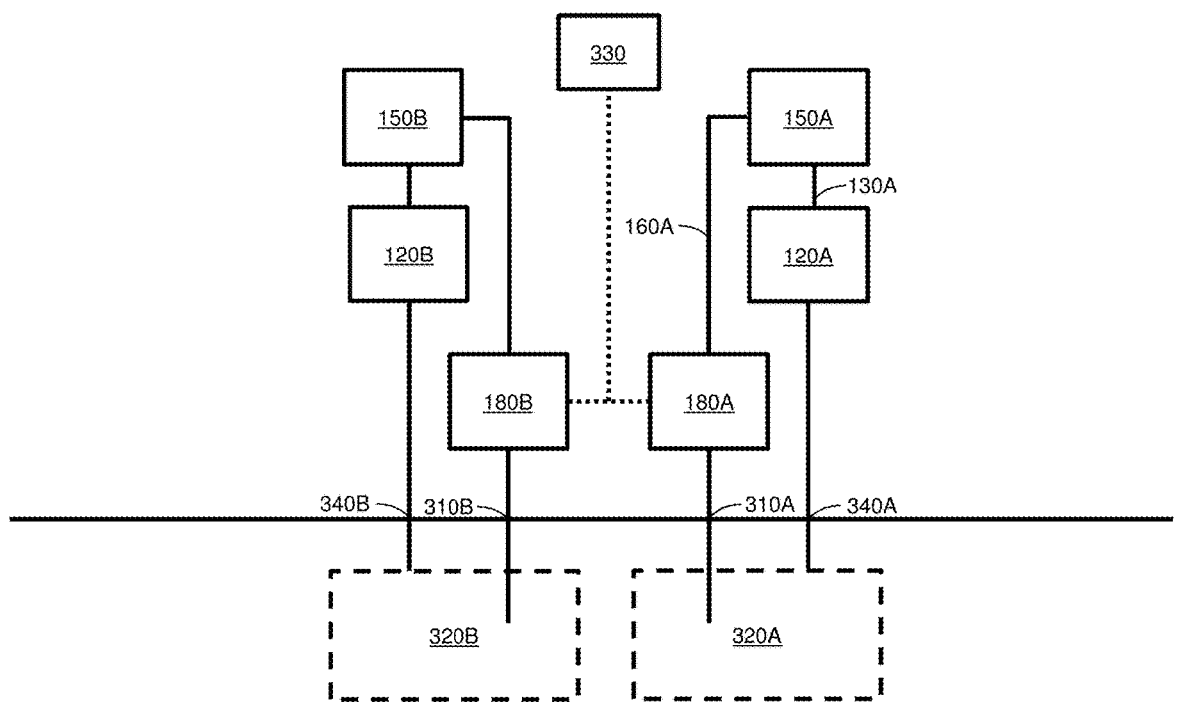

In certain embodiments, as illustrated in FIG. 3B, at least a portion of the mixture from subterranean volume 320B can be transported to second separation unit 120B, and, in certain embodiments, subsequently to second water purification unit 150B.

Additional description of examples of the various units that can be used in the hydrocarbon extraction systems described herein is now provided.

As noted elsewhere, certain of the inventive systems and methods described herein include or involve the use of separation units. Generally, the separation units are configured to receive a mixture comprising hydrocarbons and water and to at least partially separate the hydrocarbons and the water to produce a stream comprising higher purity water than the mixture the separation unit receives. In certain embodiments, the separation units are configured to produce a water stream in which at least about 50 wt %, at least about 75 wt %, or at least about 90 wt % of the hydrocarbons (e.g., of a combination of the solid and liquid hydrocarbons) have been removed, relative to the input stream to the separation unit. In some embodiments, the mixture comprising hydrocarbons and water being transported to the separation unit can also include gases from the well, including non-hydrocarbon gases such as $CO_2$ and $H_2S$. In some such embodiments, such gases can also be separated from the hydrocarbons and/or water and, for example, output from the separation unit via additional streams.

In certain embodiments, prior to transporting the mixture comprising hydrocarbons and water to the separation unit(s), the hydrocarbons may be diluted, for example, using a mixture of light hydrocarbons, which may include, for example, naptha. The use of such diluent can reduce the density of the hydrocarbons such that they are less dense than water.

A separation unit can include one or more devices/unit operations which, alone or in combination with each other, are configured to at least partially separate the hydrocarbons and water. For example, in certain embodiments, the separation unit comprises two or more devices that perform a series of steps that result in the at least partial separation of hydrocarbons from water. In certain embodiments, at least one of the separation units comprises at least one device that separates the hydrocarbons from the water based on differences in density between the water and the hydrocarbons.

In some embodiments, at least one of the separation units comprises at least one separation device that at least partially separates the hydrocarbons and water using centripetal force. For example, the device can be designed such that, upon or after entering the device, the mixture comprising hydrocarbons and water is subjected to a centripetal force that separates at least a portion of the water from at least a portion of the hydrocarbons based on a difference in density between the water and the hydrocarbons. In certain embodiments, the separation device comprises a substantially cylindrical section into which incoming fluid is fed tangentially (i.e., such that the fluid entry pathway forms a tangent to the curved surface of the cylinder). In some such embodiments, the separation device includes a tapered (e.g., conical) bottom section connected to the cylindrical section such that at least a portion of the denser component (e.g., at least a portion of the separated water, in certain embodiments in which diluent is used) is transported to the tapered bottom section and a least a portion of the less dense component (e.g., at least a portion of the separated hydrocarbons, in certain embodiments in which diluent is used) remains in the cylindrical section. In some such embodiments, such a separation device comprises a hydrocyclone, such as a liquid-liquid hydrocyclone. Hydrocyclones suitable for use in the embodiments described herein include, but are not limited to, de-oiling hydrocyclones obtainable from Siemens Water Technologies, Warrendale, Pa., optionally modified to handle high hydrocarbon to water ratios (e.g., ratios as high as 1:3 or greater). In certain embodiments, the separation unit that at least partially separates the hydrocarbons and water using centripetal force may also at least partially separate a gas component (e.g., $CO_2$, $H_2S$, and/or another gas), from the water and/or hydrocarbons.

At least one of the separation units comprises, in certain embodiments, at least one separation device that at least partially separates hydrocarbons and water based on density differences via gravity (e.g., settling and/or floating). For example, the separation device can include at least one inclined surface along which the mixture comprising water and hydrocarbons is transported. Such devices can be configured such that, as the mixture is transported along the plate(s), at least a portion of the denser component (e.g., water, in certain embodiments in which the hydrocarbons are diluted) sinks while at least a portion of the less dense component (e.g., hydrocarbons, in certain embodiments in which the hydrocarbons are diluted) floats. The floating component (e.g., hydrocarbons) can be removed from the remaining components (e.g., the purified water stream) using conventional separation techniques. In some such embodiments, such a separation device comprises an inclined plate separator, such as a pressurized inclined plate separator. Inclined plate separators suitable for use in the embodiments described herein include, but are not limited to, pressurized corrugated plate interceptor (CPI) separators obtainable from Monarch Separators, Inc., Houston, Tex.

In some embodiments, at least one of the separation units comprises at least one separation device comprising a vessel into which the mixture comprising hydrocarbons and water is transported and within which hydrocarbons can float to the top. In certain such embodiments, the vessel can be configured such that gas (e.g., nitrogen, helium, argon, air, and/or another gas that is not substantially reactive with the hydrocarbons) can be dissolved in the mixture within the vessel. In certain embodiments, the gas can be dissolved under pressure, which can subsequently be released (e.g., to atmospheric pressure) within the vessel. The release of the gas pressure can result in the formation of gas bubbles within the mixture. In certain embodiments, at least a portion of the hydrocarbons (e.g., in the form of solids and/or certain viscous liquids) within the mixture can adhere to the bubbles and subsequently be separated from the liquid within the vessel (e.g., by allowing the gas bubbles to rise to the top of the mixture). The solids and remaining liquid can then be separated using common separation techniques such as, for example, skimming a layer of material from the top of the separator. In some such embodiments, such a separation device comprises an induced gas flotation device. Induced gas flotation devices suitable for use in the embodiments described herein include, but are not limited to, vertical single-chamber induced gas flotation units available from Cameron Process Systems, Houston, Tex., such as the TST-CFU Compact Flotation Unit.

Figure 4:
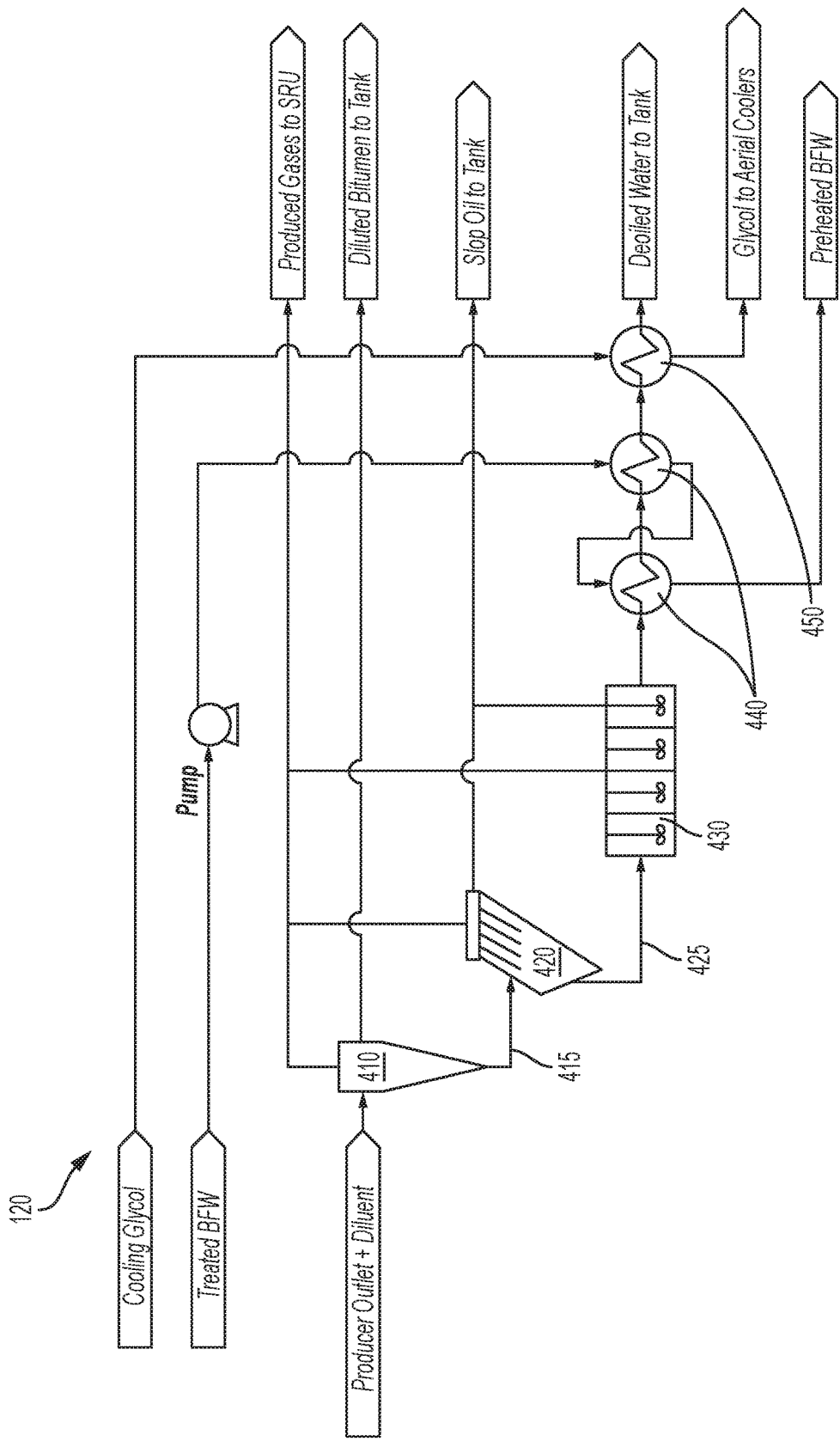
FIG. 4 is a schematic illustration of an exemplary separation unit, according to one set of embodiments.

In some embodiments, combinations of these separation devices may be employed. FIG. 4 is a schematic illustration of an exemplary separation unit 120 in which three separation devices are employed in series. Separation device 410 can be configured to at least partially separate hydrocarbons from water using centripetal force (and can include any of the features of such devices described above). In some such embodiments, separation device 410 corresponds to a hydrocyclone. Separation devices 420 and/or 430 can be configured to at least partially separate hydrocarbons from water via settling (and can include any of the features of such devices described above). In some such embodiments, separation device 420 corresponds to an inclined plate separator. In some embodiments, separation device 430 corresponds to an induced gas flotation device.

In certain embodiments, both separation device 410 and separation device 420 can be configured to at least partially separate hydrocarbons from water using centripetal force (and can include any of the features of such devices described above). In some such embodiments, separation device 410 and separation device 420 correspond to hydrocyclones. In some such embodiments, separation devices 430 can be configured to at least partially separate hydrocarbons from water via settling (and can include any of the features of such devices described above). In some such embodiments, separation device 430 corresponds to an induced gas flotation device.

In certain embodiments, two or more of the separation devices within a separation unit can be fluidically connected in series (i.e., such that the output of one of the devices is connected to the input of another device, and optionally, directly fluidically connected to the input of the other device). In FIG. 4, for example, output stream 415 from device 410 (e.g., a hydrocyclone) is transported to device 420 (e.g., an inclined plate separator, a second hydrocyclone, etc.). Similarly, in FIG. 4, output stream 425 from device 420 (e.g., an inclined plate separator, a second hydrocyclone, etc.) is transported to device 430 (e.g., an induced gas flotation device).

In certain embodiments, one or more heat exchangers can be incorporated into the hydrocarbon extraction process, for example, to recover excess heat from various of the fluid streams within the system. In certain embodiments, the heat exchangers can be configured to transfer excess heat from the effluent water stream from the separation unit to, for example, the effluent stream from the water purification unit. As one example, in the exemplary embodiment illustrated in FIG. 4, heat exchangers 440 are configured to transfer heat from an effluent water stream from device 430 to the inlet stream to a steam generation unit. Arranging the heat exchangers in this manner can allow for the pre-heating of the water that is fed to the steam generation unit(s), thereby enhancing system efficiency. In certain embodiments, one or more additional heat exchangers can be used to further cool an effluent stream from a separation device. For example, in the exemplary embodiment illustrated in FIG. 4, heat exchanger 450 is configured to transfer heat from an effluent water stream from device 430 to a coolant (e.g., glycol or other suitable coolant).

The invention is not limited to the types of separation devices described herein. Other hydrocarbon/water separation techniques (in addition to those described herein) are known to those of ordinary skill in the art, and given the present disclosure, one of ordinary skill in the art would be capable of designing separation units that could be used in addition to or in place of the separation units described herein. In addition, the invention is not limited to the combinations of the separation devices described herein, and other combinations could be employed.

As noted elsewhere, certain of the inventive systems and methods described herein include or involve the use of water purification units. Generally, the water purification units are configured to receive a water-containing feed stream and to remove at least a portion of ions (e.g., cations) contained within the feed stream to produce a product stream having a higher water purity than the feed stream. In certain embodiments, the water purification unit(s) can be configure to receive an output (in certain embodiments, directly) from a separation unit(s). In certain embodiments, the water purification units are configured to produce a water stream in which at least about 50 wt %, at least about 75 wt %, or at least about 90 wt % of the multivalent cations have been removed, relative to the input stream to the water purification unit. In some embodiments, the water purification units are configured to produce a water stream in which at least about 50 wt %, at least about 75 wt %, or at least about 90 wt % of the sum of the calcium, magnesium, and strontium ions have been removed, relative to the input stream to the water purification unit. In certain embodiments, the water purification units are configured to produce a water stream in which at least about 50 wt %, at least about 75 wt %, or at least about 90 wt % of the calcium ions have been removed, relative to the input stream to the water purification unit.

A water purification unit can include one or more devices/unit operations which, alone or in combination with each other, are configured to remove at least a portion of ions from a water-containing stream. For example, in certain embodiments, the water purification unit comprises two or more devices that perform a series of steps that result in the at least partial removal of ions from a water-containing stream.

In certain embodiments, at least one water purification unit comprises a softener configured to form precipitant salts comprising the ions (e.g., multivalent cations such as calcium, magnesium, and strontium ions, and the like) within the feed stream and a precipitant separator (separate from the softener unit), configured to at least partially separate the precipitant formed by the softener from water within the feed stream to produce the product stream. In many traditional systems, ion removal is performed using a single, large unit (e.g., an ion scavenger within a large vessel) that performs both the softening and the separation steps. However, the separation of precipitant from the remaining water is often the rate limiting step in such processes. Therefore, according to certain embodiments, the precipitant formation (which is relatively fast) is performed in a first vessel while separation is performed in a second, separate device in which separation can be accelerated (such as a hydrocyclone). This can allow for a large reduction in size of the process equipment, which can allow for the construction of a water purification unit that is portable and modular.

Accordingly, in some embodiments, at least one of the water purification units comprises a softener. In some such embodiments, such a softener comprises a lime softener. The lime softener comprises, in certain embodiments, a vessel containing lime (i.e., $Ca(OH)_2$). The lime can be added to the vessel prior to, during, and/or after the addition of the cation-containing water. As cation-containing water is mixed with the lime in the vessel, calcium ions, magnesium ions, and other ions may be removed from the water via precipitation. For example, at least a portion of the calcium ions within the water may form calcium carbonate. At least a portion of the magnesium ions in the water may form magnesium hydroxide. The lime softener can be a hot lime softener (e.g., operated at a temperature of at least about 100° C. (and, in certain embodiments, at least about 108° C.)) or a warm lime softener (e.g., operated at a temperature of from about 49° C. to about 60° C.). In certain embodiments, the lime softener can be operated at any temperature equal to or greater than about 49° C., greater than or equal to about 75° C., greater than or equal to about 100° C., or greater than or equal to about 108° C.

At least one of the water purification units comprises, in certain embodiments, a precipitant separator. The precipitant separator can be configured to at least partially separate the precipitant formed by the softener (e.g., the lime softener) from water within the feed stream to produce an output stream comprising higher purity water than the input stream fed to the precipitant separator. The precipitant separator may separate the precipitant from the water based on differences in density between the precipitant and the water, in certain embodiments. In some embodiments, the precipitant separator can have any of the configurations described above with respect to the separation unit. For example, in some embodiments, the precipitant separator comprises a hydrocyclone, such as a solid liquid hydrocyclone. Suitable hydrocyclones include, but are not limited to, those available from Siemens Water Technologies, Warrendale, Pa. In some embodiments, the output of the softener is fluidically connected to (e.g., directly fluidically connected to) the input of the precipitant separator.

In some embodiments, at least one of the separation units comprises an ion-exchange device. The ion-exchange device can comprise, for example, an ion-exchange medium, which can be used to exchange monovalent cations (e.g., $Na^+$) for the multivalent cations (e.g., $Ca^{2+}$, $Mg^{2+}$, $Sr^{2+}$, and the like) from the water stream. Any suitable ion-exchange medium can be used in the ion-exchange device. In certain embodiments, a weak acid cation (WAC) ion-exchange medium (e.g., in the form of a resin) can be used. Any suitable WAC ion-exchange medium can be used, such as the DOWEX™ line of WAC resins (e.g., DOWEX™ MAC-3 resin), available from Dow Chemical Company, Midland, Mich. In certain embodiments, the ion-exchange device comprises a packed column. The ion-exchange device can comprise a plurality of packed columns, in certain embodiments, one of which may be used to replace the other when the ion-exchange medium within the other column is spent and in need of regeneration. Packed columns suitable for use in ion-exchange devices include, but are not limited to, those obtainable from Marlo, Inc., Racine, Wis. (e.g., the MCP series condensate polishers, or other suitable ion-exchange devices).

Figure 5:
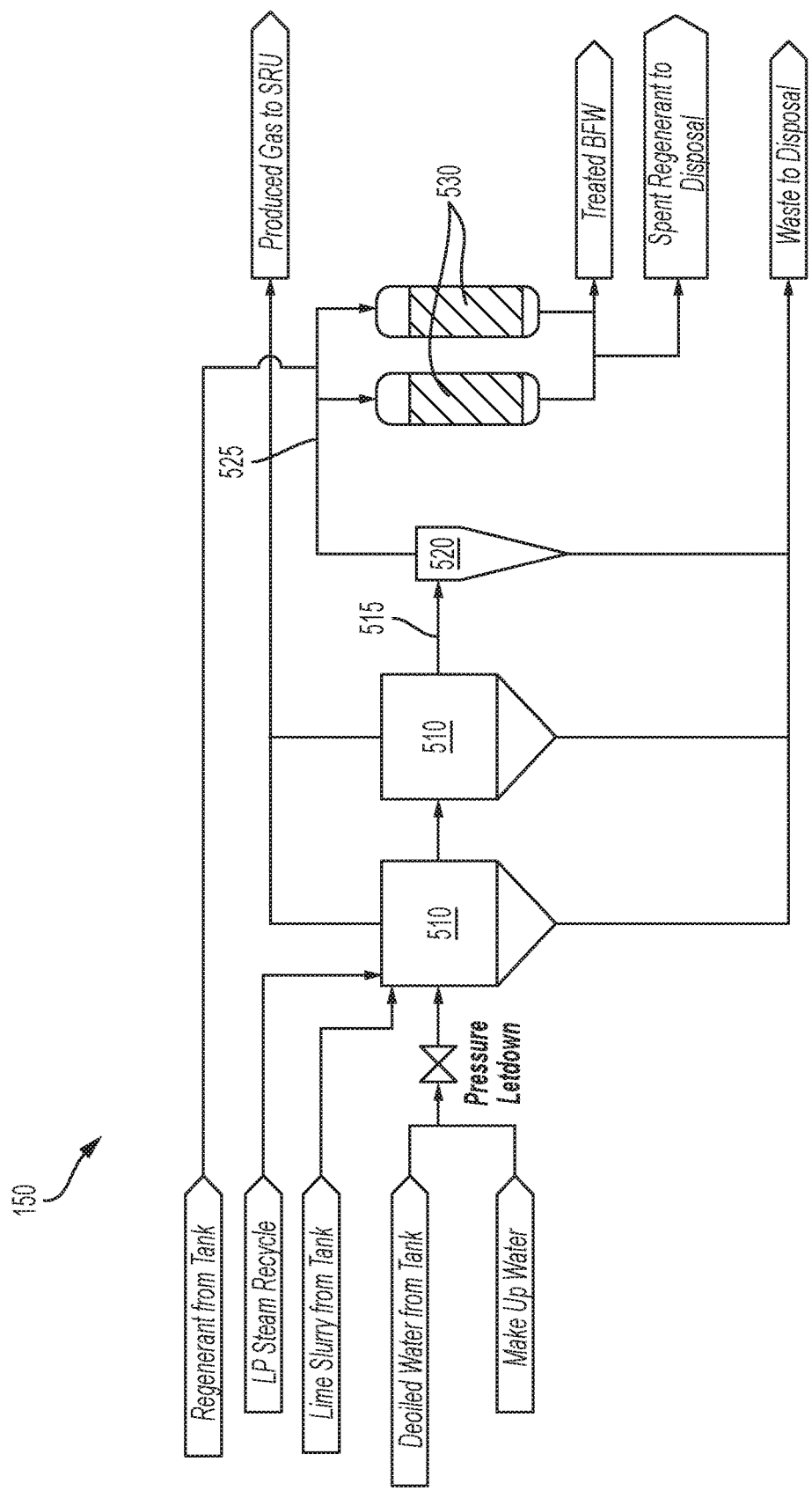
FIG. 5 is, according to some embodiments, a schematic illustration of an exemplary water purification unit.

In some embodiments, combinations of these water purification devices may be employed in the water purification unit. FIG. 5 is a schematic illustration of an exemplary water purification unit 150 in which three types of separation devices are employed in series. Separation devices 510 can comprise softeners configured to form precipitant salts, such as lime softeners. Separation device 520 can comprise a precipitant separator, such as a hydrocyclone. Separation devices 530 can comprise ion-exchange devices, such as packed columns comprising an ion-exchange medium.

In certain embodiments, two or more of the devices within a water purification unit can be fluidically connected in series (i.e., such that the output of one of the devices is connected to the input of another device, and optionally, directly fluidically connected to the input of the other device). In FIG. 5, for example, output stream 515 from device 510 (e.g., one or more lime separators) is transported to device 520 (e.g., a hydrocyclone). Similarly, in FIG. 5, output stream 525 from device 520 (e.g., a hydrocyclone) is transported to device 530 (e.g., ion-exchange devices).

The invention is not limited to the types of water purification devices described herein. Other water purification techniques (in addition to those described herein) are known to those of ordinary skill in the art, and given the present disclosure, one of ordinary skill in the art would be capable of designing water purification units that could be used in addition to or in place of the water purification units described herein. In addition, the invention is not limited to the combinations of the water purification devices described herein, and other combinations could be employed.

As noted elsewhere, certain of the inventive systems and methods described herein include or involve the use of steam generation units. Generally, the steam generation units are configured to receive a water-containing feed stream and to produce steam from the water (e.g., by combusting one or more fuels to heat the water). In certain embodiments, the steam generation unit(s) can be configured to receive an output (in certain embodiments, directly) from a water purification unit(s).

A steam generation unit can include one or more devices which, alone or in combination with each other, are configured to produce steam. In certain embodiments, at least one steam generation unit comprises a once-through steam generator. Steam generators suitable for use in the systems methods described herein include, but are not limited to, once-through steam generators such as those obtainable from Vapor Power International, Franklin Park, Ill., such as the Modulatic series of boilers.

In certain embodiments, one or more flash drums can be located downstream of the steam generation devices, which can be used, for example, to separate liquid water from vaporized steam from a saturated steam/water mixture that exits the steam generation devices in certain instances. In some such embodiments, including certain embodiments in which the system is part of a SAGD process, the flash drums can be configured to produce substantially 100% steam, which can subsequently be injected into a subterranean volume. In some embodiments, one or more high-pressure flash drums (e.g., in which the pressure can be at least about 200 psig, at least about 400 psig, or greater) can be used to produce a first stream containing substantially pure steam (e.g., at least about 99 wt % or at least about 99.9 wt % steam), which can be transported to the subterranean volume to enhance hydrocarbon extraction. The high-pressure flash drum can also produce a second stream comprising liquid water (and, in certain embodiments, impurities). In some such embodiments, a low-pressure flash drum (e.g., operating at a pressure of less than about 100 psig, less than about 50 psig, or less than about 25 psig) can be used to produce an additional high purity steam stream, and remove liquid water and/or impurities from the first stream. For example, the low pressure flash drum may be used to produce a first stream of substantially pure steam (e.g., at least about 99 wt % or at least about 99.9 wt % steam) and a second stream comprising liquid water (and/or concentrated contaminants, such as residual hydrocarbons, calcium carbonate, and/or silica, and the like). The concentrated contaminants can be disposed, while the low pressure steam can be recycled (e.g., by redirecting the low pressure steam to the water treatment unit(s)).

The steam generation unit(s) can be configured to inject steam back into the subterranean volume at an elevated pressure, in certain embodiments. For example, in some embodiments, the steam generation unit(s) are configured to inject steam at a gauge pressure of at least about 2 bar, at least about 5 bar, at least about 10 bar, at least about 20 bar, at least about 30 bar, or higher.

Figure 6:
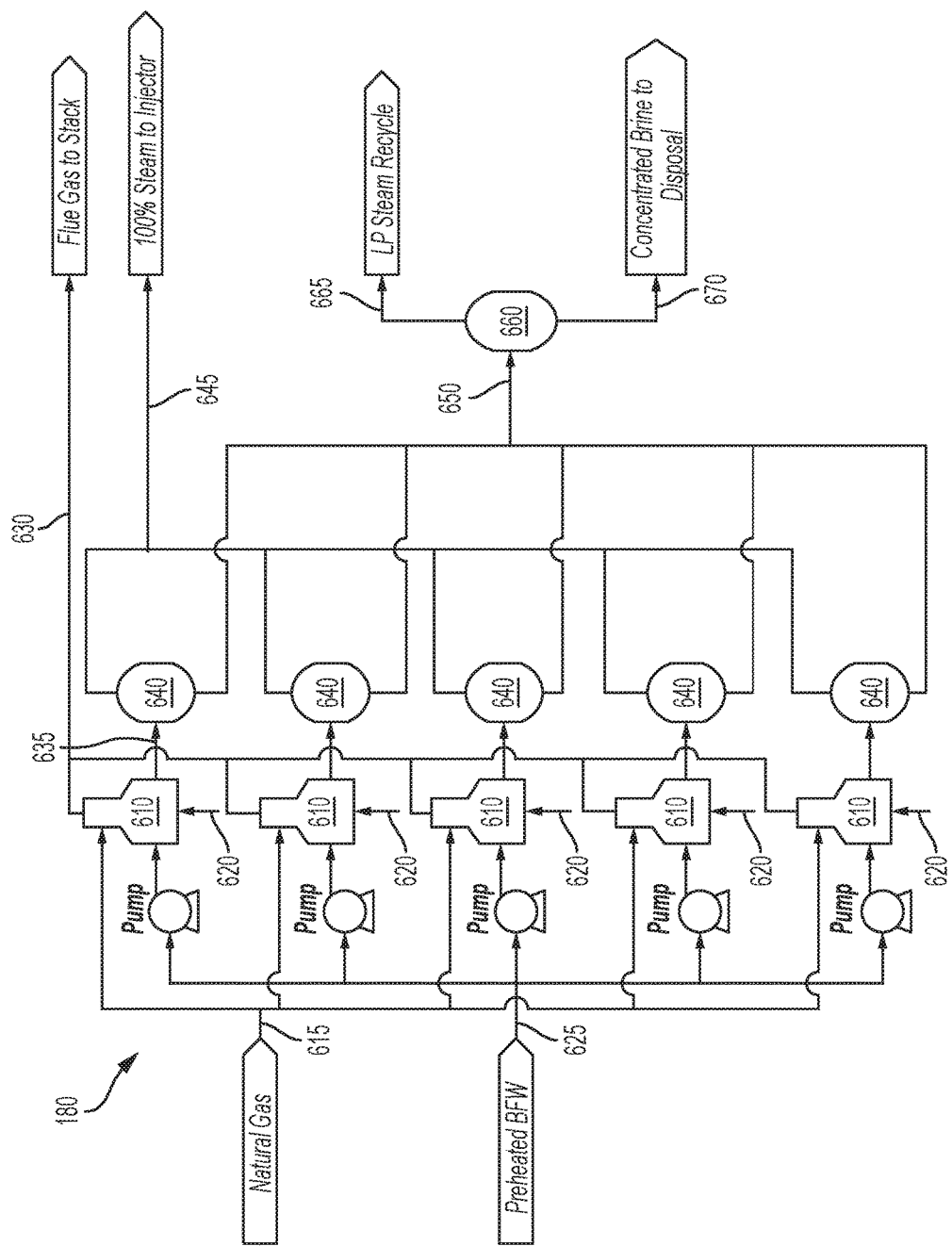
FIG. 6 is a schematic illustration of an exemplary steam generation unit, according to certain embodiments.

FIG. 6 is a schematic illustration of an exemplary steam generation unit, according to certain embodiments. In FIG. 6, steam generation unit 180 comprises a plurality of once-through steam generators 610. Fuel (e.g., natural gas) and oxidant (e.g., air) can be transported to steam generators 610 via streams 615 and 620, respectively. Water (e.g., from water purification device(s) 150) can be transported into steam generators 610 via streams 625. Exhaust from the steam generators can be vented via streams 630. The steam produced by the steam generators can be transported out of the steam generators via streams 635. In certain embodiments, optional flash drums 640 (e.g., high-pressure flash drums) can be configured to receive the steam output from steam generators 610. Flash drums 640 can produce first streams 645 comprising high purity steam (which can be transported to a subterranean space) and second streams 650 comprising liquid water. Liquid water streams 650 can be subsequently transported to flash drum 660 (e.g., a low-pressure flash drum). Flash drum 660 can be configured to produce low-pressure, high-purity steam stream 665 and stream 670 comprising liquid water.

The invention is not limited to the types of steam generation devices described herein. Other steam generation techniques (in addition to those described herein) are known to those of ordinary skill in the art, and given the present disclosure, one of ordinary skill in the art would be capable of designing steam generation units that could be used in addition to or in place of the steam generation units described herein. In addition, the invention is not limited to the combinations of the steam generation devices described herein, and other combinations could be employed.

Various of the modules, units, and components described herein are described as being "fluidically connected" to each other. Generally, a fluid connection exists between a first object and a second object (and the two objects are said to be "fluidically connected" to each other) when they are interconnected with each other (e.g., via conduits, unit operations, or other system components) such that an uninterrupted fluid pathway can be established (which may in certain cases involve the opening of one or more valves or other flow control devices), which can be traced from the first object to the second object. Generally, objects that are both fluidically connected to a common external environment (e.g., a common airspace, a common water space, a common subterranean space, or the like) but are not otherwise connected are not fluidically connected to each other (although they would be fluidically connected to the environment) for the purposes of this invention.

In certain embodiments, various of the modules, units, and components described herein are "directly fluidically connected" to other modules, units, and/or components. Generally, a direct fluid connection exists between a first object and a second object (and the two objects are said to be "directly fluidically connected" to each other) when they are fluidically connected to each other and the composition of the fluid does not substantially change (i.e., no fluid component changes in relative abundance by more than 5% and no phase change occurs) as it is transported from the first object to the second object. As an illustrative example, a stream that connects first and second components, and in which the pressure and temperature of the fluid is adjusted but the composition of the fluid is not altered, would be said to directly fluidically connect the first and second components. If, on the other hand, a separation step is performed or a chemical reaction is performed that substantially alters the composition of the stream contents during passage from the first component to the second component, the stream would not be said to directly fluidically connect the first and second components. In certain of the embodiments described herein, at least a portion of the water purification units are directly fluidically connected to at least a portion of the separation units. At least a portion of the steam generation units, in some embodiments, are directly fluidically connected to the water purification units. In some embodiments, at least a portion of the steam generation units are directly fluidically connected to the subterranean volume.

In certain embodiments, any of the units described herein (e.g., the separation units, water purification units, and/or steam generation units) can be portable. For example, in some embodiments, any of the units described herein can be sized or otherwise configured to fit within relatively small volumes, have a relatively small mass, and/or have a relatively low height during shipping and/or operation. The use of small and/or lightweight units (and/or modules of such units, as discussed in more detail below) can provide a variety of advantages. For example, small and/or lightweight units can allow for easy transport to and/or from the hydrocarbon extraction site, relatively fast assembly without the need for heavy duty assembly equipment, and/or enhanced safety during transport and/or operation of the units, among other benefits. In addition, because system construction can be greatly simplified, far less cleared land may be required for construction laydown areas, topsoil piling, construction camps, and the like when certain of the inventive systems are employed. The ability to exchange units within the system also can allow for, in certain embodiments, the testing of the effectiveness of newly-designed units. For example, in certain embodiments, a separation unit, water purification unit, and/or steam generation unit may be newly designed and not yet tested in the field. In some such embodiments, an operational unit can be exchanged for the newly-designed unit, the newly-designed unit can be tested in the field (e.g., without the need for system shutdown), and the performance of the newly-designed unit can be tested. If the newly-designed unit functions effectively, multiple similar units can be manufactured and inserted into the system. If the newly-designed system does not work properly, the design can be adjusted, and re-tested later.

In some embodiments, the hydrocarbon extraction systems (and associated methods) described herein can include one or more modules, units, and/or modularized units (e.g., separation modules and/or units, water purification modules and/or units, and/or steam generation modules and/or units) configured to have a capacity that is substantially smaller than traditional large scale hydrocarbon extraction equipment and/or processes. For example, in some embodiments, the systems and methods described herein can include at least one module (or at least 5 modules, or at least 10 modules, or more modules) through which less than or equal to about 10,000 bbl/day or less than or equal to about 5000 bbl/day of hydrocarbons (e.g., liquid hydrocarbons) from subterranean volumes are transported. In certain embodiments, the systems and methods described herein can include at least one unit (or at least 5 units, at least 10 units, or more units) through which less than or equal to about 10,000 bbl/day or less than or equal to about 5000 bbl/day of hydrocarbons (e.g., liquid hydrocarbons) from subterranean volumes are transported. In certain embodiments, the systems and methods described herein can include at least one modularized unit (or at least 5 modularized units, or at least 10 modularized units, or more modularized units) through which less than or equal to about 10,000 bbl/day or less than or equal to about 5000 bbl/day of hydrocarbons (e.g., liquid hydrocarbons) from subterranean volumes are transported. In some embodiments, one, more (e.g., at least 5, at least 10, or more), all, and/or substantially all of the units, modules, and/or modularized units (e.g., within a system) are configured such that, during operation, less than or equal to about 10,000 bbl/day or less than or equal to about 5000 bbl/day of hydrocarbons (e.g., liquid hydrocarbons) from subterranean volumes are transported through them. In some embodiments, one, more (e.g., at least 5, at least 10, or more), all, and/or substantially all of the units, modules, and/or modularized units (e.g., within a system) are configured such that, during operation, at least about 100 bbl/day of hydrocarbons (e.g., liquid hydrocarbons) from subterranean volumes are transported through them.

In some embodiments, the systems and methods described herein can be configured or arranged to extract at least about 100 bbl/day, at least about 500 bbl/day, at least about 1000 bbl/day, or at least 1500 bbl/day of hydrocarbons (e.g., liquid hydrocarbons) from subterranean volumes.

One of ordinary skill in the art would understand that a volume of 1 bbl corresponds to 42 U.S. gallons (with 1 U.S. gallon being equal to approximately 3.785 liters).

The invention is not limited to hydrocarbon production of any particular capacity, and in certain embodiments, hydrocarbon production capacities larger or smaller than those within the above-recited ranges are also possible.

In certain embodiments, the units described herein can be containerized (for example, storable and moveable within a standard shipping container), which can allow the components to be shipped via highways and railways. In certain embodiments, at least one, several, or all of the separation units, the water purification units, and/or the steam generation units within the system can fit, while assembled in functional form, within a standard 40-foot high cube ISO shipping container (i.e., a container having a 40-foot length, an 8.5 foot width, and a 9.5 foot height). A unit or component is said to be assembled in functional form when the unit or component has been assembled as it will be used in the field, absent external fluidic conduits or wiring that may be needed to operate the unit/component.

In some embodiments, the units described herein can be relatively lightweight. The use of lightweight units can allow for easy assembly and interchangeability during operation of the system. In certain embodiments, each individual modularized separation unit, modularized water purification unit, and modularized steam generation unit within the system has a mass not exceeding 65,000 lbs (or not exceeding 55,000 lbs, or not exceeding 45,000 lbs). Those of ordinary skill in the art would understand that 1 lb corresponds to 0.45359237 kilograms. In some such embodiments, the modularized units (including those having a mass within any of the ranges above) can be used in a system having a hydrocarbon output capacity of at least about 100 bbl per day.

In certain embodiments, the systems described herein can be relatively close to the ground during use. In certain embodiments, the system has a hydrocarbon output capacity of at least 100 bbl/day and none of the maximum heights of the separation units, the water purification units (if present), and the steam generation units (if present) exceed 20 feet during operation of the system. It should be understood that the maximum height of the units within the system during operation does not include fluidic conduits such as pipes or exhaust stacks, and is measured in relation to ground level. Such "short" systems can be produced, in certain embodiments, by designing the system such that none of the containers in which the units are contained must be positioned with their longest dimensions extended upward from the ground. The use of short systems can enhance safety and allow for relatively easy system construction, as all system units can be assembled, for example, using a mobile container crane.

Figure 7A:
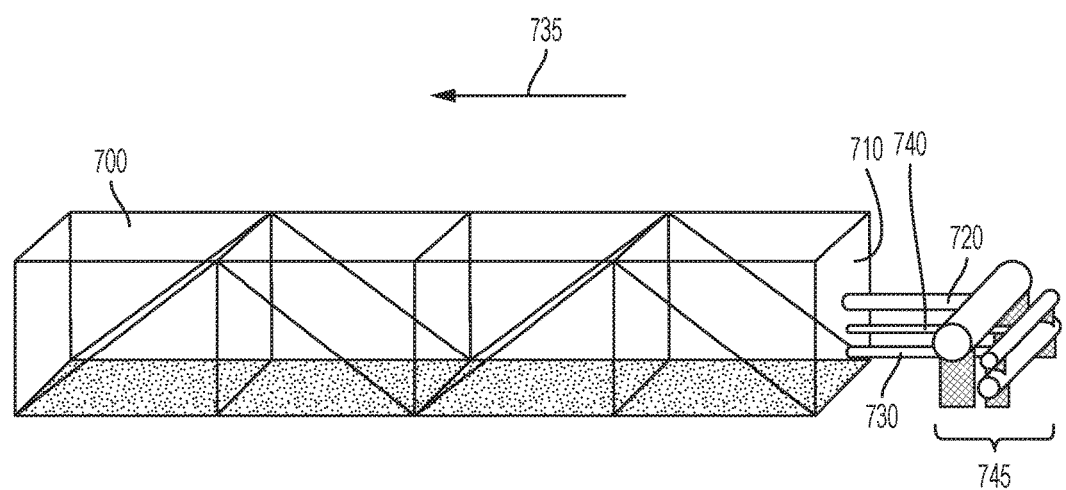
FIGS. 7A-7B are exemplary schematic illustrations showing the connection of one or more modules to a central manifold, according to some embodiments.

As noted elsewhere, certain embodiments involve the use of modules comprising units (e.g., separation units, water purification units, and/or steam generation units). An exemplary module 700 is illustrated, for example, in FIG. 7A. Other exemplary modules 700A and 700B are illustrated schematically in FIG. 7B. The modules described herein can comprise open walls or interfaces, for example, as illustrated in FIG. 7A. The module can include, for example, module frame (e.g., made of stainless steel or other such material) that at least partially surrounds the equipment within the module. In certain embodiments, such a design can allow for stacking of the modules during module transportation and/or storage (e.g., in a warehouse or other storage facility). In addition, the module frame can be designed to protect the contents of the module from damage during transport or operation. While an open module is illustrated in FIG. 7A, other embodiments could include at least partially or fully enclosed modules (with the exception of any fluidic or electrical conduits passing into or out of the module).

Figure 8A:
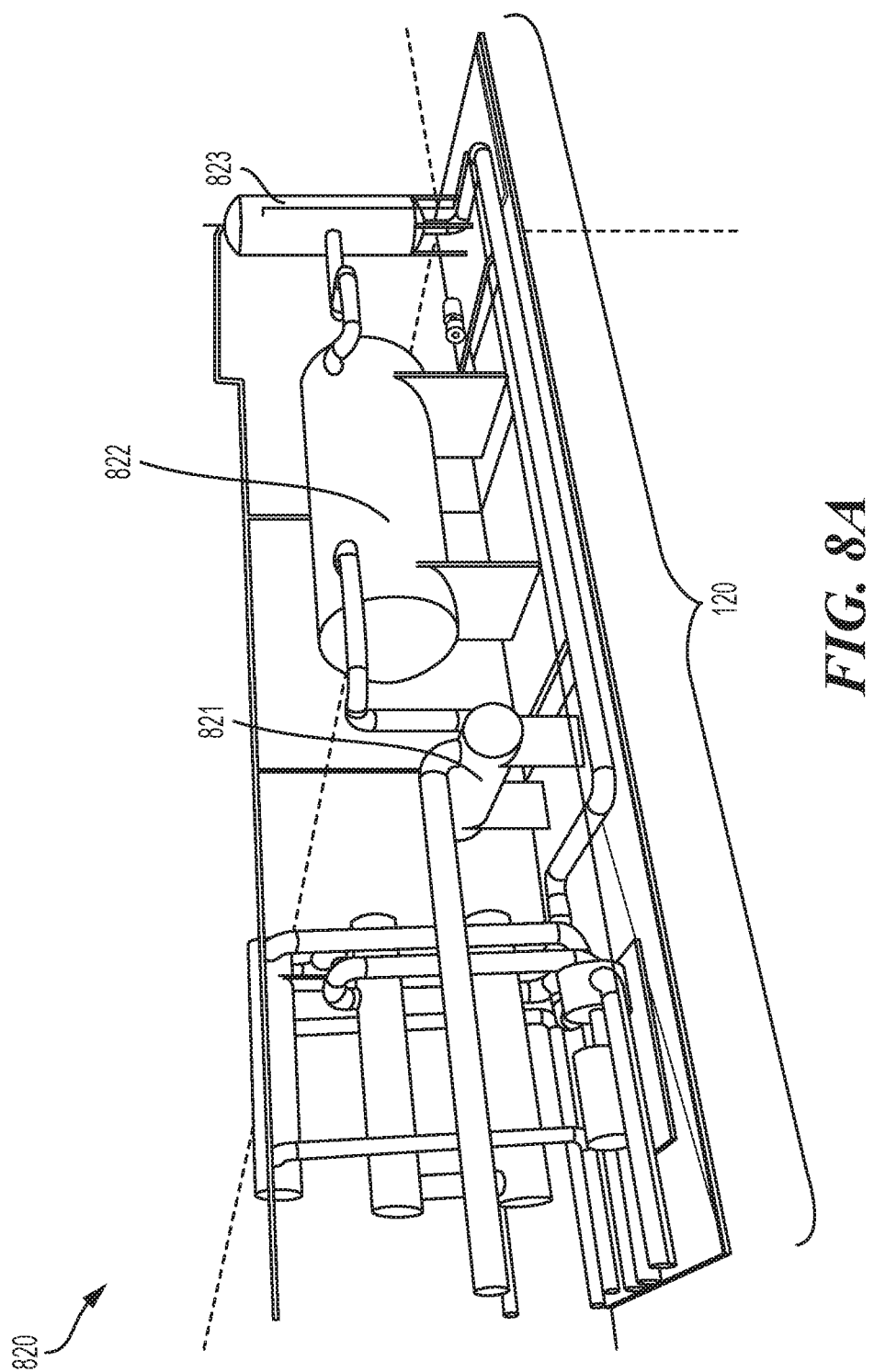
FIG. 8A is a schematic illustration, according to one set of embodiments, of a modularized separation unit.
Figure 8B:
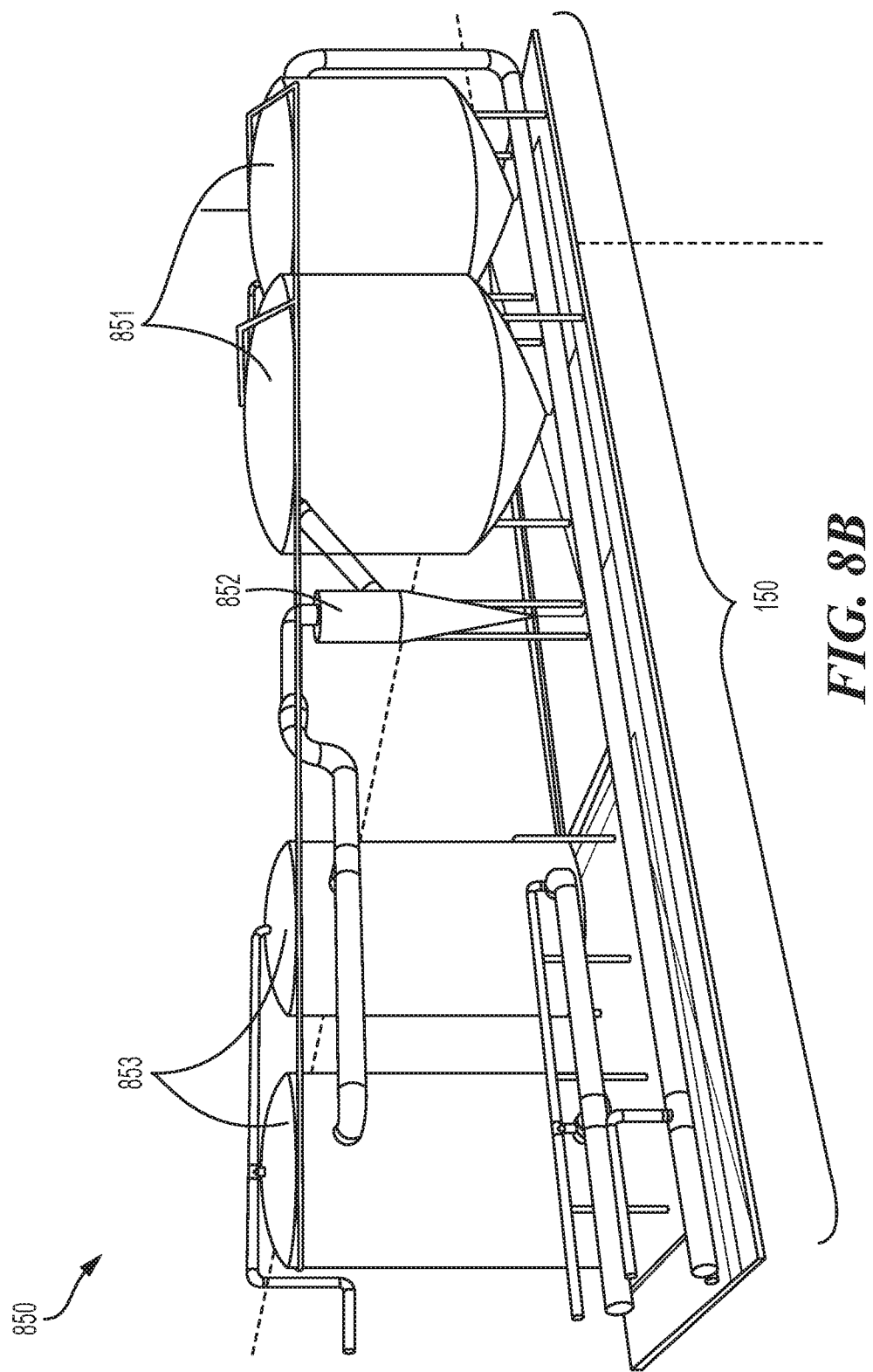
FIG. 8B is, according to some embodiments, a schematic illustration of a modularized water purification unit.
Figure 8C:
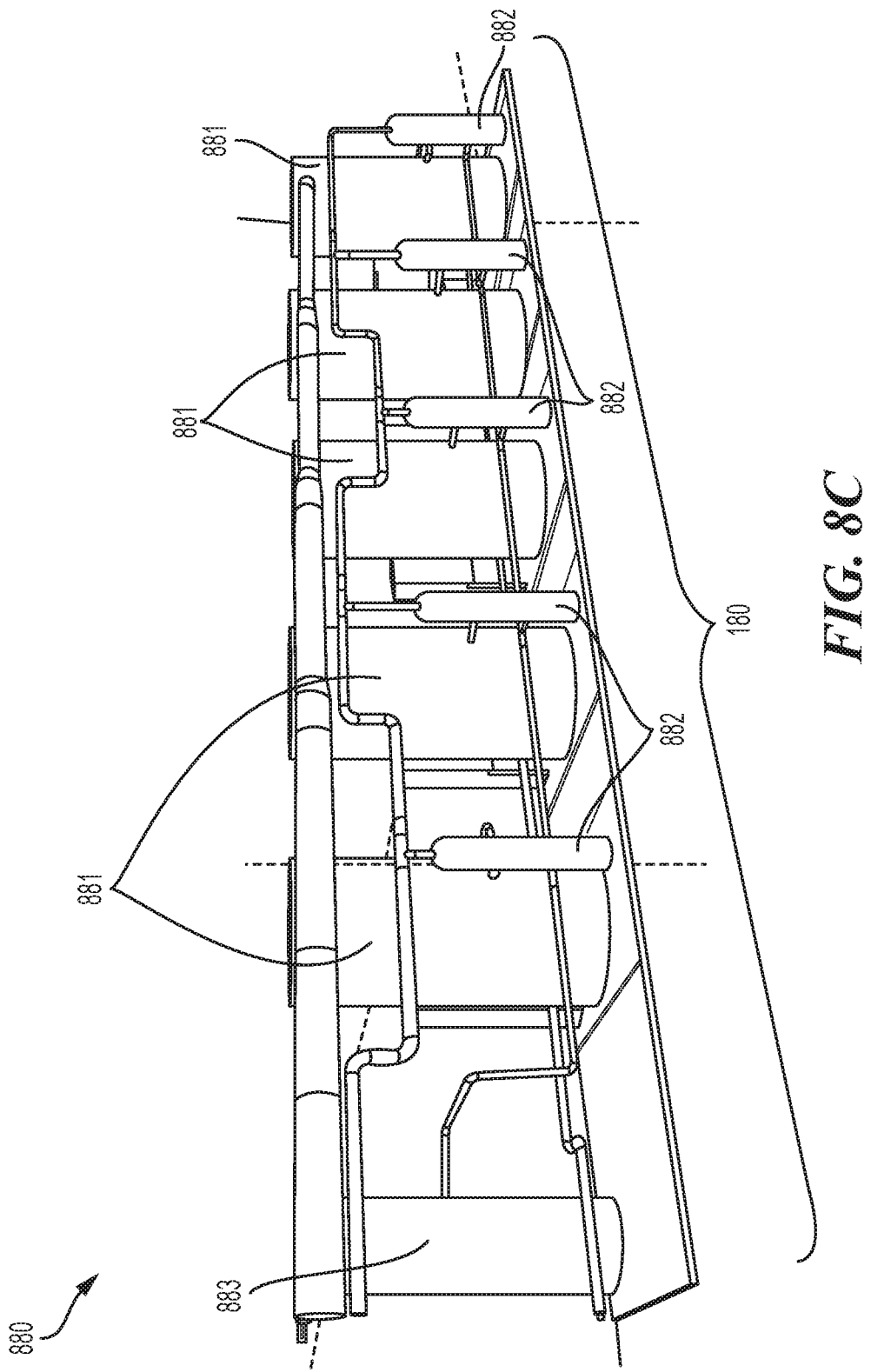
FIG. 8C is a schematic illustration of a modularized steam generation unit, according to certain embodiments.

In certain embodiments, each module within the system contains a single modularized unit. For example, FIG. 8A is a schematic illustration of a module 820 in which a modularized separation unit 120 is positioned. Separation unit 120 in module 820 can comprise, for example, hydrocyclone 821, inclined plate separation 822, and induced gas flotation unit 823. As another example, FIG. 8B is a schematic illustration of a module 850 in which a modularized water purification unit 150 is positioned. Water purification unit 150 in module 850 can comprise, for example, lime softeners 851, hydrocyclone 852, and ion-exchange devices 853. As yet another example, FIG. 8C is a schematic illustration of a module 880 in which a modularized steam generation unit 180 is positioned. Steam generation unit 180 in module 880 can comprise, for example, steam generators 881, high pressure flash units 882, and low pressure flash unit 883.

While modules 820, 850, and 880 have been illustrated as containing single modularized units, in other embodiments, modules may contain more than one modularized unit. For example, in certain embodiments, one or more modules within the system is configured such that a modularized separation unit and a modularized water purification unit are contained within a single module. For example, referring back to FIG. 1C, units 120A and 150A (and/or units 120B and 150B) could be contained within a single module, in some embodiments. In certain embodiments, one or more modules within the system is configured such that a modularized water purification unit and a modularized steam generation unit are contained within a single module. For example, referring back to FIG. 1D, units 150A and 180A (and/or units 150B and 180B) could be contained within a single module, in some embodiments. In still other embodiments, at least one module within the system is configured to include a modularized separation unit, a modularized water purification unit, and a modularized steam generation unit. For example, referring back to FIG. 1B, units 120A, 150A, and 180A (and/or units 120B, 150B, and 180B) could be contained within a single module, in some embodiments.

In some embodiments, the assembly and/or interchangeability of modules within the system can be enhanced by organizing the fluidic and/or electrical connections in a way that makes the modules easy to assemble and/or interchange. In certain embodiments, all fluidic connections and/or all electrical connections can be made to a module across no more than two interfaces of the module (and, in certain embodiments, across only a single interface of the module). To determine the "interfaces" of a module having a particular geometry, one would construct the smallest theoretical rectangular prism that encloses the module and includes a face that is parallel to the ground on which the module rests. The interfaces of the module would then correspond to the six sides of the rectangular prism. In the case of a module that is in the shape of a rectangular prism, the interfaces of the module correspond to the six sides of the module.

As one particular example, referring to FIG. 7A, module 700 may contain one or more units of an overall hydrocarbon extraction system (e.g., a separation unit, a water purification unit, and/or a steam generation unit). In FIG. 7A, all fluidic and electrical connections are made across interface 710 of module 700. For example, conduit 720 can correspond to a fluidic input (e.g., for transporting a mixture comprising hydrocarbons and water to a separation unit within module 700, for transporting ion-containing water to a water purification device within module 700, for transporting water to a steam generation unit within module 700, and/or for transporting a purge stream through a unit(s) within module 700). In FIG. 7A, conduit 730 can correspond to a fluidic output conduit (e.g., for transporting ion-containing water away from a separation unit within module 700, for transporting at least partially de-ionized water away from a water purification device within module 700, for transporting steam away from a steam generation unit within module 700, and/or for transporting a purge stream away from a unit(s) within module 700). In other embodiments, more or fewer fluidic conduits may be used. In certain embodiments, a third, fourth, fifth, or additional fluidic conduit can be connected to the units within module 700 through interface 710. In some embodiments, optional conduit 740 can be used to house electrical wires for making electrical connections to the unit(s) within module 700. In certain embodiments, all of the conduits (e.g., fluidic and/or electrical conduits) extending through interface 710 of module 700 can be substantially parallel (i.e., such that no two fluidic conduits and/or no two electrical conduits make an angle of greater than 5° with each other).

By making the fluidic and electrical connections in this way, module 700 may be removed from the system, for example, simply by stopping flow to the module (e.g., by closing one or more valves or by otherwise stopping the flow of fluid to the module) and moving the module away from the central conduit. For example, in FIG. 7A, module 700 can be removed, for example, by moving module 700 in direction 735 after flow to module 700 has been cut off.

Figure 7B:
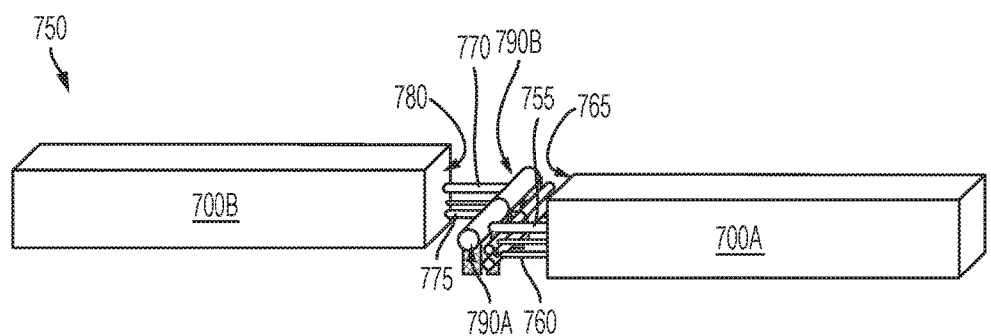

In certain embodiments, multiple modules can be connected to an input stream such that the modules are easily disassembled. For example, referring to FIG. 7B, system 750 includes first module 700A and second module 700B. In FIG. 7B, first module 700A comprises a first separation unit configured to receive a first portion of a mixture comprising the hydrocarbons from a subterranean well via a first mixture stream and to produce a first separated stream comprising higher purity water than the first mixture stream. First mixture stream 755 can be fluidically connected to an input of first module 700A. First separated stream 760 can be fluidically connected to an output of first module 700A. In addition, module 700A can comprise module interface 765 through which the first module input and the first module output are fluidically connected to the separation unit within module 700A. In addition, as illustrated in FIG. 7B, second module 700B can comprise a second separation unit configured to receive a second portion of a mixture comprising the hydrocarbons and water from the subterranean well via second mixture stream 770 and to produce second separated stream 775 comprising higher purity water than second mixture stream 770. In FIG. 7B, second mixture stream 770 is fluidically connected to an input of second module 700B and second separated stream 775 is fluidically connected to an output of second module 700B. Second module 700B can comprise module interface 780 through which the second module input and the second module output are fluidically connected to the separation unit within module 700B.

Figure 7C:
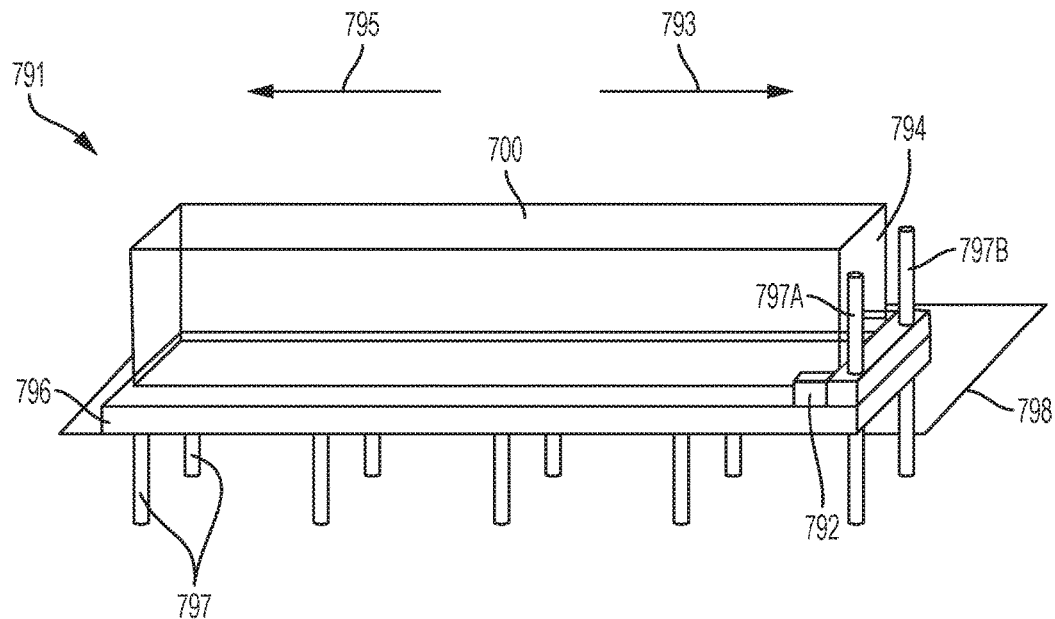
FIG. 7C is, according to certain embodiments, an exemplary schematic illustration of a module positioned on a docking bay.

In some such embodiments, one or more modules within the system can be aligned with and connected to external piping (e.g., manifold segments) using a docking bay. The docking bay comprises, in certain embodiments, one or more alignment structures that can be used to guide the module into its proper aligned position. An exemplary docking bay 791 is illustrated in the schematic diagram of FIG. 7C. As illustrated in FIG. 7C, alignment structure 792 comprises raised portions that are sized and positioned to produce a mating receptacle that substantially matches the external shape of module 700. Module 700 can be connected to the system, for example, by sliding or otherwise moving module 700 in the direction of arrow 793 and subsequently connecting the fluidic and/or electrical conduits to the module via interface 794. To remove module 700 from the system, the fluidic and electrical connections can be severed, for example by shutting down flow to the module and subsequently disconnecting the conduits. Module 700 can be removed by sliding or otherwise moving module 700 in the direction of arrow 795. Optionally, docking bay 791 can comprise a primary platform 796, which can comprise, for example, a platform of reinforced concrete (or other suitable material). Primary platform 796 can comprise reinforcement structures 797, which can extend through the ground surface 798. Reinforcement structures 797 can comprise, for example, piles (e.g., made of steel, concrete, or other such suitable material). In certain embodiments, the reinforcement structures underneath the alignment structure can extend above ground and/or above the alignment structure, for example, to reinforce the alignment structure and/or to protect module piping. For example, in FIG. 7C, reinforcement structures 797A and 797B extend above ground level 798 and above alignment structures 792.

Figure 7D:
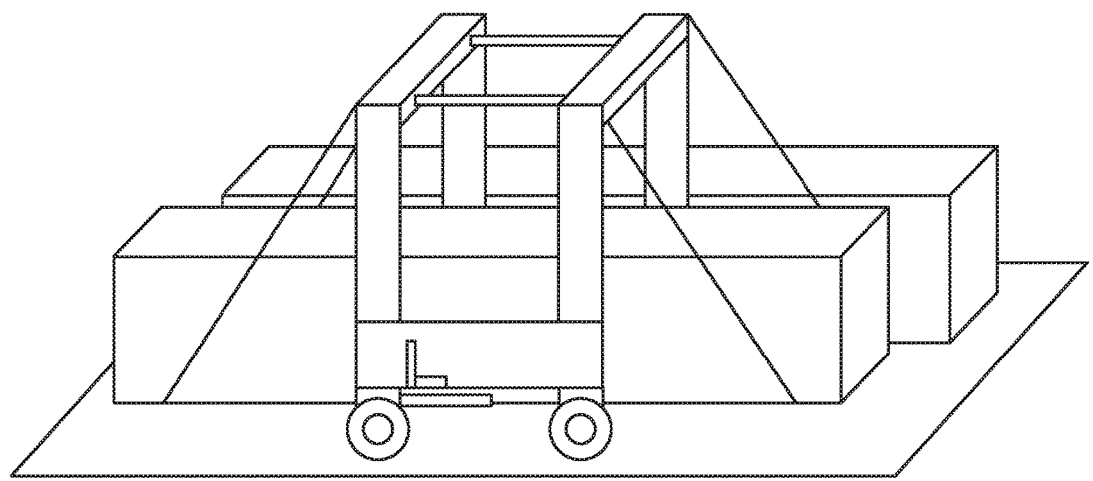
FIG. 7D is a schematic illustration of a crane that may be used to transport modules, according to some embodiments.

Transport of modules can be accomplished using, for example, a self-propelled container crane as illustrated, for example, in FIG. 7D. The container crane can be configured to access a module from behind by being positioning such that it straddles the module. The crane can then lift the module and transport it to any desired location.

Figure 9A:
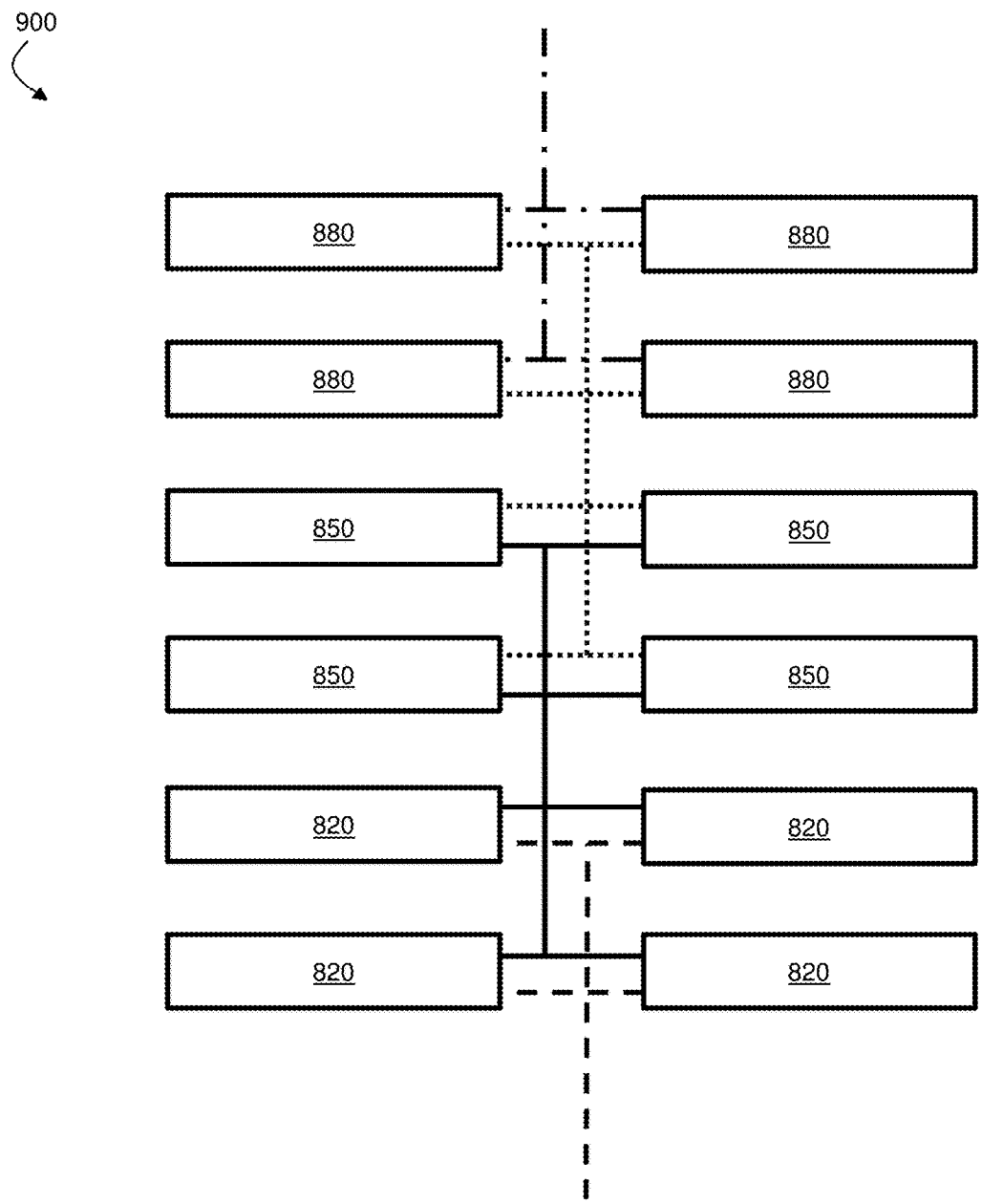
FIGS. 9A-9B are schematic illustrations showing the interconnectivity of modularized units, according to some embodiments.
Figure 9B:
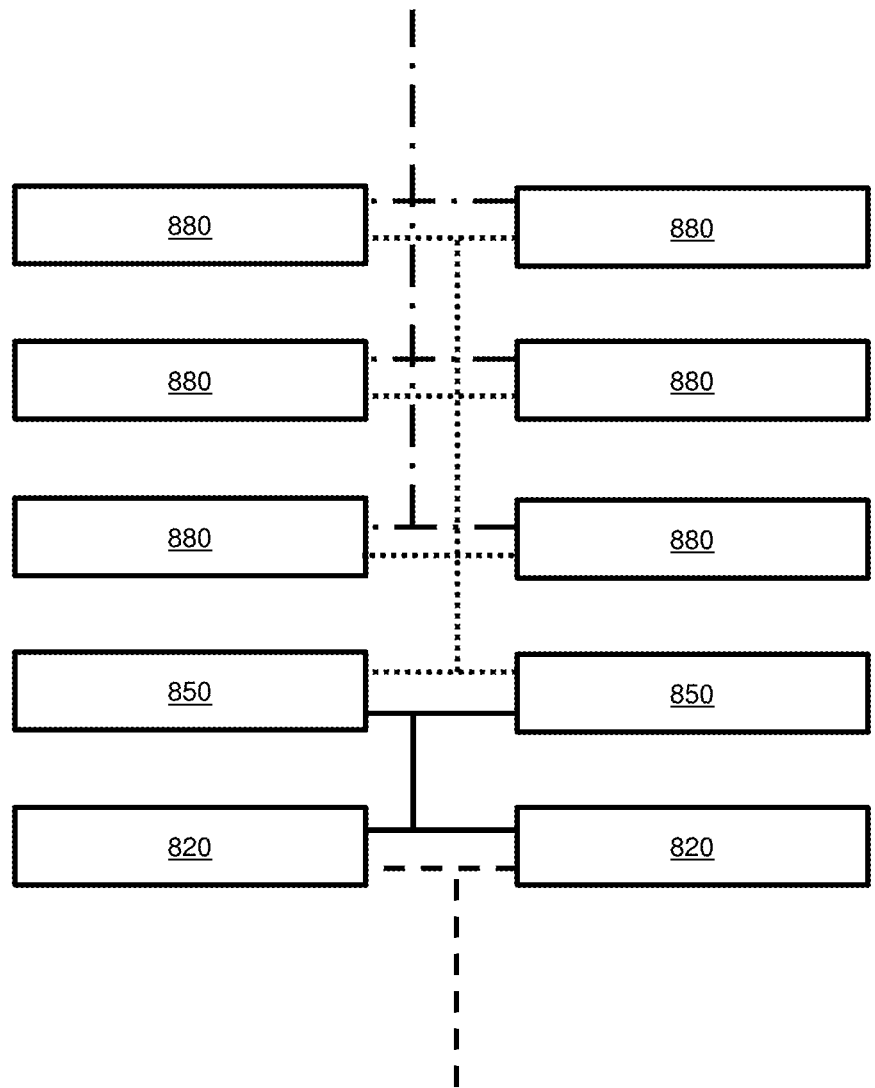

While FIG. 7B includes two modules connected to a central manifold, the systems described herein can include any number of modules connected in this fashion. For example, FIG. 9A is a schematic diagram of system 900, in which four separation modules 820, four water purification modules 850, and four steam generation modules 880 are each fluidically connected through a single interface of the modules to a centralized system of conduits. FIG. 9B is a schematic illustration of system 910 in which two separation modules 820, two water purification modules 850, and six steam generation modules 880 are each fluidically connected through a single interface of the modules to a centralized system of conduits. In certain embodiments, a 3:1:1 ratio of steam generation modules, water purification modules, and separation modules is advantageously utilized. In FIGS. 9A-9B, the dashed lines correspond to inputs to separation units 820, the solid lines correspond to outputs from separation modules 820 (and inputs to water purification modules 850), the dotted lines correspond to outputs from water purification modules 850 (and inputs to steam generation modules 880), and the dash-dot lines indicate outputs from steam generation modules 880.

In certain embodiments, each module can be connected to the system via a manifold segment. For example, in FIG. 7A, module 700 is connected to the system via manifold segment 745. In FIG. 7B, module 700A is connected to the system via manifold segment 790A, and module 700B is connected to the system via manifold segment 790B. Manifold segments from adjacent modules can be connected, according to certain embodiments, to form a manifold of a suitable length for connecting the number of modules required to operate the system. Optionally, unconnected manifold segments can be incorporated into the manifold to allow for further expansion of the hydrocarbon extraction system, for example, if the output from the subterranean volume is increased. Modules may be arranged, in certain embodiments, on both sides of the central manifold, for example, in order to reduce the overall footprint of the modules. Modules may be arranged on both sides of the central manifold, for example, by alternating mirror-imaged manifold segments, as shown in FIG. 7B. In some embodiments, the length of each manifold segment is selected such that a walkway of sufficient width is maintained between manifolds (e.g., at least 5 feet, in some embodiments), for example, to facilitate equipment inspection, manifold installation, and/or manifold removal.

In some embodiments, one or more connections between modules and the central manifold (e.g., segments of the central manifold) can be made using a flexible conduit (e.g., braided steel flexible pipe), which can allow for the correction of minor misalignments between the central manifold and the modules and/or compensate for thermal expansion and/or contraction.

The portability and ease of assembly and/or interchangeability of system units can reduce and/or eliminate plant downtime (e.g., plant shutdown and/or plant turnaround). A turnaround is a planned, total plant outage that can last from a few days to several weeks for many traditional systems, and can be repeated as frequently as yearly in many traditional systems. Certain of the system designs described herein, including certain of the containerized designs described herein, can render plant shutdown and/or turnaround unnecessary or only infrequently necessary. For example, in some cases, a planned maintenance schedule can be established according to which each container is exchanged for a spare container so that the replaced container may be inspected and/or repaired at the desired maintenance interval without interrupting production. If a unit within the system fails, the container in which the unit is housed may be quickly exchanged for a spare container while the replaced unit is repaired.

The inventive systems and methods can be used in a variety of applications in which the removal of hydrocarbons from a subterranean volume is desired. Such systems and methods can be used to remove any type of hydrocarbons, including those in a solid, liquid, or gaseous state at any point in the process. Certain of the inventive systems and methods described herein can be used to remove bitumen, oil-containing shale, liquid crude oil, or any other type of hydrocarbon that can be found in subterranean volumes. In certain embodiments, the systems and methods described herein can be used to extract and/or at least partially separate liquid and/or solid hydrocarbons. For example, the hydrocarbons may be in primarily liquid form, in the form of a solid suspended in a liquid (e.g., a hydrocarbon-containing solid suspended in a liquid hydrocarbon and/or a hydrocarbon containing solid suspended in a non-hydrocarbon liquid), or any other suitable form. In certain embodiments, at least a portion of the hydrocarbons that are extracted using the systems and methods described herein have an API gravity of about 22.3 degrees or lower. API (which stands for American Petroleum Institute) gravity is a type of specific gravity measurement used by those of ordinary skill in the art in the hydrocarbon extraction industry. While API gravity technically has no units (see Equation 1 below), it is commonly referred to in the industry as having a unit of degrees. The API gravity of a hydrocarbon (such as an oil) can be determined from the following formula:

$$API \text{ Gravity} = \frac{141.5}{SG} - 131.5 \qquad [1]$$

wherein SG is the specific gravity of the hydrocarbon at 60° F. This definition results in water having an API of 10 degrees, with higher API gravities corresponding to less dense oils.

In some embodiments, the systems and methods described herein can be used as part of a steam assisted gravity drainage (SAGD) process. In such processes, and as described above, two well conduits are drilled into the subterranean volume, and steam is transported into the subterranean volume through one of the well conduits. In some such processes, the well conduit through which steam is injected is positioned higher than the other well, which is used to remove fluidized hydrocarbons from the subterranean space.

The systems and methods described herein can also be used in cyclic steam stimulation (CSS) processes. In some such processes, steam is injected into a subterranean volume for a certain amount of time to heat the hydrocarbons to a temperature at which they may flow. This step can be followed by a "soaking" step, during which the viscosity of the hydrocarbons may be reduced. Hydrocarbons can then be flowed from the subterranean volume (e.g., via natural flow induced by the steam pressure and/or by additional pumping), for example, via the well that was used to inject the steam or via another well. The injection, soaking, and removal steps can be repeated multiple times for a single subterranean volume, in certain cases.

In certain embodiments, the systems and methods described herein can be part of a fracking process (e.g., a hydraulic fracking process). In such processes, the steam generation portions of the processes described herein are generally not performed and may be replaced by other units, e.g. water pressurization units. Generally, in such processes, pressurized water is transported into the subterranean volume at a rate sufficient to increase pressure within the subterranean volume such that rock formations crack. As the rock cracks, the fracture fluid continues further, liberating hydrocarbons trapped within the rock. A mixture comprising the hydrocarbons and the pressurized water can be recovered from the subterranean volume and separated, for example, using any of the processes described herein.

U.S. Provisional Patent Application Ser. No. 61/780,256, filed Mar. 13, 2013, and entitled "Modular System for Extracting Hydrocarbons from Subterranean Volumes and Associated Methods" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for extracting hydrocarbons from a subterranean volume, comprising:
   flowing a mixture comprising hydrocarbons and water from the subterranean volume to a plurality of fluidically connected separation units;
   at least partially separating the hydrocarbons from the water using the separation units to produce a first stream comprising higher purity water than the mixture; and
   fluidically disconnecting at least one of the separation units from the remaining separation units while the separating step is being performed.

2. The method of claim 1, comprising flowing at least a portion of the first stream to a plurality of water purification units fluidically connected to each other and to the separation units, and removing at least a portion of ions within the first stream using the water purification units to produce a second stream comprising higher purity water than the first stream.

3. A method for extracting hydrocarbons from a subterranean volume, comprising:
   flowing a mixture comprising hydrocarbons and water from the subterranean volume to a separation unit;
   at least partially separating the hydrocarbons from the water using the separation unit to produce a first stream comprising higher purity water than the mixture; and
   fluidically connecting an additional separation unit to the separation unit while the separating step is being performed.

4. The method of claim 3, comprising flowing at least a portion of the first stream to a water purification unit fluidically connected to the separation unit, and removing at least a portion of ions within the first stream using the water purification unit to produce a second stream comprising higher purity water than the first stream.

5. The method of claim 4, comprising fluidically connecting an additional water purification unit to the water purification unit while the removing step is being performed.

6. The method of claim 4, wherein the water purification unit comprises a lime softener.

7. The method of claim 4, wherein the water purification unit comprises a hydrocyclone.

8. The method of claim 7, wherein an output stream of a lime softener is transported to the hydrocyclone.

9. The method of claim 4, comprising producing steam, within a steam generation unit, from at least a portion of the second stream from the water purification unit.

10. The method of claim 3, wherein flowing a mixture comprising hydrocarbons and water comprises flowing a mixture comprising hydrocarbons having an API gravity of about 22.3 degrees or lower and water.

11. The method of claim 3, wherein flowing a mixture comprising hydrocarbons and water comprises flowing a mixture comprising bitumen and water.

12. The method of claim 3, wherein flowing a mixture comprising hydrocarbons and water comprises flowing a mixture comprising shale oil and water.

13. The method of claim 3, wherein at least one of the separation units comprises a hydrocyclone.

14. The method of claim 13, wherein an output stream from the hydrocyclone is transported to an inclined plate separator.

15. The method of claim 13, wherein at least one of the separation units comprises a first hydrocyclone and a second hydrocyclone, and wherein an output stream from the first hydrocyclone is transported to the second hydrocyclone.

16. The method of claim 3, wherein at least one of the separation units comprises an inclined plate separator.

17. The method of claim 3, wherein at least one of the separation units comprises an induced gas flotation device.

18. The method of claim 17, wherein an output stream from an inclined plate separator is transported to the induced gas flotation device.

19. The method of claim 3, wherein:
the separation unit is part of a module, wherein:
the mixture comprising the hydrocarbons and the water from the subterranean volume is transported to the module via a module input;
the first stream comprising the higher purity water than the mixture is transported out of the module via a module output; and
the module comprises a module interface in which the module input and the module output are located such that the module input and the module output face in substantially the same direction.

20. A modular system for extracting hydrocarbons from a subterranean volume, comprising:
a first module comprising a first separation unit configured to receive a first portion of a mixture comprising the hydrocarbons from a subterranean well via a first mixture stream and to produce a first separated stream comprising higher purity water than the first mixture stream, wherein:
the first mixture stream is fluidically connected to a first module input,
the first separated stream is fluidically connected to a first module output, and
the first module comprises a module interface in which the first module input and the first module output are located such that the first module input and the first module output face in substantially the same direction; and
a second module comprising a second separation unit configured to receive a second portion of a mixture comprising the hydrocarbons and water from the subterranean well via a second mixture stream and to produce a second separated stream comprising higher purity water than the second mixture stream, wherein:
the second mixture stream is fluidically connected to a second module input,
the second separated stream is fluidically connected to a second module output,
the second module comprises a module interface in which the second module input and the second module output are located such that the second module input and the second module output face in substantially the same direction.

* * * * *